US007052278B2

(12) United States Patent
Johnson et al.

(10) Patent No.: US 7,052,278 B2
(45) Date of Patent: May 30, 2006

(54) AUTOMATED LANGUAGE ACQUISITION SYSTEM AND METHOD

(75) Inventors: Carol M. Johnson, Oro Valley, AZ (US); Janet L. Nicol, Tucson, AZ (US)

(73) Assignee: Renaissance Learning, Inc., Wisconsin Rapid, WI (US)

( * ) Notice: Subject to any disclaimer, the term of this patent is extended or adjusted under 35 U.S.C. 154(b) by 281 days.

(21) Appl. No.: 10/399,298

(22) PCT Filed: Sep. 17, 2001

(86) PCT No.: PCT/US01/28976

§ 371 (c)(1),
(2), (4) Date: Apr. 15, 2003

(87) PCT Pub. No.: WO02/35501

PCT Pub. Date: May 2, 2002

(65) Prior Publication Data

US 2004/0029084 A1   Feb. 12, 2004

Related U.S. Application Data

(60) Provisional application No. 60/241,719, filed on Oct. 20, 2000.

(51) Int. Cl.
*G09B 19/00* (2006.01)

(52) U.S. Cl. .................... 434/156; 434/157; 434/167

(58) Field of Classification Search ............... 434/156, 434/157, 167
See application file for complete search history.

(56) References Cited

U.S. PATENT DOCUMENTS

| 5,540,589 | A |   | 7/1996  | Waters |
|-----------|---|---|---------|--------|
| 5,697,789 | A | * | 12/1997 | Sameth et al. ............... 434/157 |
| 5,735,693 | A | * | 4/1998  | Groiss ......................... 434/157 |
| 5,870,709 | A |   | 2/1999  | Bernstein |
| 5,885,083 | A |   | 3/1999  | Ferrell |
| 6,077,085 | A |   | 6/2000  | Parry et al. |
| 6,120,297 | A | * | 9/2000  | Morse et al. ................ 434/169 |
| 6,224,383 | B1 | * | 5/2001 | Shannon ..................... 434/156 |

(Continued)

OTHER PUBLICATIONS

Bradlow, a., Pisoni, D., Akahane-Yamada, R., Tokhura, Y. (1997). Training Japanese listeners to identify English /r/ and /l/: IV. Some effects of perceptual learning on speech production. *Journal of the Acoustical Society of America.* pp. 2299-2310 & *an Abstract of article.*

(Continued)

*Primary Examiner*—Chanda L. Harris
(74) *Attorney, Agent, or Firm*—Lawrence R. Oremland, P.C.

(57) ABSTRACT

The present invention provides a system and method for language teaching that involves training to an automatic level a set of core vocabulary items, and then presenting learned items in combination as a means of implicitly teaching grammar. In one aspect, a method for teaching a language, consistent with the invention, comprises: (a) while displaying to a learner a graphical representation of a vocabulary item comprising at least one word, playing to the learner an audio recording comprising the spoken form of the vocabulary item; and (b) while displaying to a learner both a graphical representation of the vocabulary item and the written form of the vocabulary item, playing to the learner an audio recording comprising the spoken form of the vocabulary item.

8 Claims, 12 Drawing Sheets

U.S. PATENT DOCUMENTS

| | | | |
|---|---|---|---|
| 6,305,942 B1 | 10/2001 | Block et al. | |
| 6,328,569 B1* | 12/2001 | Jenkins et al. | 434/169 |
| 6,343,935 B1* | 2/2002 | Clements | 434/156 |
| 2001/0003040 A1* | 6/2001 | Spector | 434/167 |

OTHER PUBLICATIONS

Genesee, F. (2000). Brain Research: Implications for Second Language Learning. *ERIC Digest*, EDO-FL-00-12 (Dec. 2000). 1-5.

Lively, S., Logan, J., & Pisoni, D. (1993). Training Japanese listeners to identify English /r/ and /l/: II. The role of phonetic environment and talker variability in learning new perceptual categories. *Journal of the Acoustical Society of America*, 94, 1242-1255.

Manguson, J., Yamada, R., Tohkura, Y., Pisoni, D., & Bradlow, A. (1995). *The role of talker variability in nonnative phoneme traning*. Paper presented at the Spring Meeting of the Acoustical Society of Japan.

Maye, J. G., L. (2000). *Learning phonemes without minimal pairs*. Paper presented at the 24th Annual Boston University Conference on Language Development. Mar. 2000.

Richards, J., Platt, J., & Platt, H. (1992). *Dictionary of Language Teaching & Applied Linguistics*: Longman. pp. 386, 387 and pp. 392, 393.

Truscott, J. (1998). Instance theory and universal grammar in second language research. *Second Language Research*, 14(3), 257-291.

Bradlow, Pisoni, Yamada, & Tohkura, "Acquisition of the English /r/-/l/ Contrast by Japanese Speakers: Effects of Training in Perception on Production." *ICPhS 95 Stockholm*, vol. 4 pp. 562-565, session 85.2.Summary.

***Akahane-Yamada, Tohkura, Bradlow & Pisoni. "Does Tranining in Speech Perception Modify Speech Production?" *ATR Human Information Processing Research Laboratories*, Kyoto, Japan & Indiana University, Bloominton, USA.

* cited by examiner

FIGURE 16

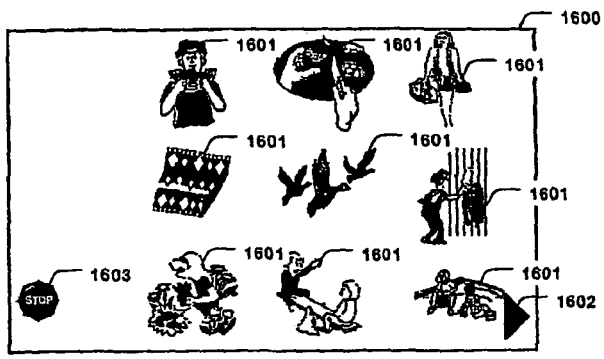

FIGURE 17

| | | | |
|---|---|---|---|
| 1. 0 | 24. book, a | 47. football, a | 70. sandwich, a |
| 2. 1 | 25. boy, a | 48. french fries | 71. school bus, a |
| 3. 2 | 26. brown | 49. girl, a | 72. shirt, a |
| 4. 3 | 27. bus, a | 50. glass, a | 73. shoes |
| 5. 4 | 28. car, a | 51. golf club, a | 74. shorts |
| 6. 5 | 29. cat, a | 52. green | 75. skating |
| 7. 6 | 30. chair, a | 53. hamburger, a | 76. skirt, a |
| 8. 7 | 31. clouds | 54. hand, a | 77. sleeping |
| 9. 8 | 32. colors | 55. head, a | 78. snake, a |
| 10. 9 | 33. computer, a | 56. jacket, a | 79. soccer ball, a |
| 11. animals | 34. desk, a | 57. jeans | 80. socks |
| 12. apple, an | 35. dog, a | 58. lamp, a | 81. swimming |
| 13. arm, an | 36. door, a | 59. leg, a | 82. teacher, a |
| 14. backpack, a | 37. dress, a | 60. motorcycle, a | 83. television, a |
| 15. baseball, a | 38. ear, an | 61. nose, a | 84. tennis racket, a |
| 16. basketball, a | 39. eating | 62. orange (color) | 85. tree, a |
| 17. bed, a | 40. egg, an | 63. pencil, a | 86. truck, a |
| 18. bicycle, a | 41. eye, an | 64. pillow, a | 87. walking |
| 19. bird, a | 42. feet | 65. playing | 88. white |
| 20. black | 43. finger, a | 66. rabbit, a | 89. window, a |
| 21. blanket, a | 44. fire truck, a | 67. reading | 90. yellow |
| 22. blouse, a | 45. flower, a | 68. red | |
| 23. blue | 46. foot, a | 69. running | |

FIGURE 18

| Grammatical Structure | Sentences/Short Phrases |
|---|---|
| Noun phrases: singular; indefinite article | a blue eye<br>a brown football<br>a red apple<br>a white rabbit<br>a yellow flower |
| Noun phrases: plural | blue eyes<br>brown footballs<br>red applies<br>white rabbits<br>yellow flowers |
| Noun phrases: count nouns | five flowers<br>four cats<br>one apple<br>nine eggs<br>two feet |
| Noun phrases: count nouns + adjectives | three red apples<br>four brown footballs<br>five yellow flowers<br>a black and white soccer ball<br>one yellow flower |
| Sentences: definite article | The football is brown.<br>The soccer balls are black and white.<br>The fire truck is red.<br>The eggs are white.<br>The flowers are yellow. |
| Sentences: it is / it's | It is a dog.<br>It is a cat.<br>It's a pencil.<br>It's a motorcycle.<br>It's a blouse. |
| Sentences: this is / these are | This is a pillow<br>This is a chair.<br>This is an egg.<br>These are pillows.<br>These are chairs. |
| Sentences: he/she has; they have | He has two feet.<br>She has two hands.<br>He has brown eyes.<br>They have blue eyes.<br>They have two arms. |
| Sentences: Third person singular | She is eating.<br>He is swimming.<br>The boy is running.<br>The girl is reading.<br>The girl is playing. |
| Sentences: Third person plural | The boys are sleeping.<br>They are skating.<br>The boy and girl are running.<br>They are eating.<br>They are walking. |

FIGURE 19

| LESSON No. | TOPICS/VOCABULARY USED | VERB TENSE | GRAMMATICAL STRUCTURES TAUGHT | DIALOGUES USED | DESCRIPTIONS USED |
|---|---|---|---|---|---|
| 1 | •animals<br>•body parts<br>•clothing<br>•colors<br>•food<br>•sports<br>•transportation | •present | •definite/indefinite article<br>•noun phrases<br>•it is/it's<br>•this is/these are<br>•he/she has/ they have<br>•regular noun plurals<br>•to be: 3rd person sing/pl | | |
| 2 | •activities<br>•body parts<br>•clothing<br>•household items<br>•numbers<br>•occupations<br>•school | •present progressive | •subject pronouns<br>•1st / 2nd person<br>•affirmative/negative statements<br>•yes/no questions and short responses<br>•to be<br>•to have | •introduction | •simple descriptions |
| 3 | •food<br>•home<br>•numbers<br>•size<br>•classroom/students | •present progressive | •adjectives<br>•possessive<br>•adjectives/pronouns<br>•wh questions and responses | •counting objects | •describing physical traits |
| 4 | •outdoor activities<br>•weather | •present progressive | •adjectives<br>•possessive adjectives<br>•yes/no questions<br>•object pronouns | •interview: "do you know how to?" "can you...?" | •describing activities and weather<br>•describing talents and abilities |
| 5 | •countries/cities<br>•daily routine<br>•days of week<br>•geography<br>•nationality<br>•numbers | •present | •affirmative/negative statements<br>•adverbs<br>•possessive pronouns<br>•verbs + gerund<br>•verbs + infinitive | •interview: "do you like... ?" | •describing daily routine and personal taste (likes and dislikes)<br>•good vs. bad |
| 6 | •family<br>•holidays<br>•months of year<br>•numbers | •present | •object pronouns<br>•adverbs (often, never, rarely, sometimes)<br>•yes/no questions<br>•wh questions<br>•irregular noun plurals<br>•prepositions of location<br>•yes/no questions<br>•next, then, etc.<br>•adverbs (fast/slow) | •invitation | •describing family<br>•describing temperament |
| 7 | •daily activities<br>•fun activities; zoo beach, camping<br>•the US/cities<br>•seasons | •present | •prepositions of location<br>•yes/no questions<br>•next/then, etc.<br>•adverbs (fast/slow) | •discussion about activities (1st, 2nd, etc.) | •describing activities with ordinal numbers |
| 8 | •grocery store<br>•money<br>•numbers<br>•relaxation | •simple past | •object pronouns<br>•yes/no questions<br>•regular and irregular past tense verbs | •discussion about yesterday's activities | •describe trip to grocery store |
| 9 | •around the house<br>•health<br>•wedding | •simple past | •regular and irregular past tense verbs<br>•wh questions | •questions asking for repetition | •describing illness/symptoms |
| 10 | •transportation<br>•wedding | •simple past | •wh questions<br>•object pronouns | •interview | •reporting events |
| 11 | •locating something<br>•around the house | •past progressive | •comparisons<br>•prepositions of location<br>•one/ones | •identifying by comparing | •describing by comparing |
| 12 | •occupations<br>•at the park<br>•leisure<br>•locating something | •past progressive | •superlatives | •identification | •describing the "best" and "worst" |
| 13 | •grocery shopping<br>•restaurant | •past progressive | •object pronouns<br>•which/which one<br>•which/which ones | •purchasing food<br>•ordering at restaurant | •describing food taste (sweet/sour) |
| 14 | •telling time<br>•music<br>•sports | •immediate future | •wh questions<br>•prepositions of time | •making plans | •letter describing weekend |
| 15 | •cooking/recipes<br>•miscellaneous | •immediate future | •quantifiers<br>•imperative | •giving/receiving directions | •recipes |

AUTOMATED LANGUAGE ACQUISITION SYSTEM AND METHOD

This application is a national stage application under 35 U.S.C. § 371 of International Application No. PCT/US01/28976, filed 17 Sep. 2001, which claims priority from and is entitled to the benefit of U.S. Provisional Application No. 60/241,719, filed 20 Oct. 2000, both of which are herein incorporated by reference in their entireties.

BACKGROUND OF THE INVENTION

Field of the Invention

The present invention relates generally to language teaching and acquisition, and more particularly, to an automated system and method for teaching and learning a second or foreign language.

Language Acquisition Market

The market for second and foreign language acquisition products is broad and growing, providing a multi-billion dollar market opportunity within the $2 trillion education and training sector. There is a demonstrated need for such products in several major market segments, including the education, corporate, government, and consumer markets, both in the United States and worldwide.

Educational institutions comprise the largest segment of the market opportunity. On a global basis, elementary through university level institutions teach English as part of their required curriculum, and over 1 billion students are enrolled in schools worldwide. The demand for effective materials for leaning English outside the United States is growing in an ever-expanding global economy. In the United States, English as a Second Language (ESL) is growing in educational institutions due to an influx of immigrants, as well as increasing governmental regulations requiring students with limited English proficiency to move more quickly from bilingual and/or support classrooms to English-only classrooms. Currently in the United States, 2.8 million public school students are either in bilingual or ESL classrooms, as well as over 1.9 million adult ESL students. There are also 5 million foreign language students in United States high schools every year, making up 41% of all high school students. In addition, more than 1 million students are enrolled in foreign language courses in United States colleges and universities each semester. Thus, from the aggregate of these figures, it can be reasonably estimated that over 1 billion students per year worldwide are engaged in learning a language.

The educational market dramatically showcases the failure of existing language leaning programs. Many who have attempted to learn a foreign language in a classroom setting experience disappointment in regard to known methods. Virtually no one acquires a language from the classroom setting. While it is often believed that "living in the country" will facilitate learning the native language, the reality is that even living in the country is not enough for most adults. For example, living in the United States today are millions of adults who are enrolled in ESL classrooms, yet are still not functional in English, despite both studying the language and living in the culture.

While the difficulties faced by adults learning a second or foreign language may not be surprising, there is much evidence that it is also not easy for children. For example, using today's methods and products, it currently takes over five years for children who are not proficient in English to move from a bilingual or ESL classroom to a regular classroom. In the states of California and Arizona, laws have recently passed that withdraw state support for bilingual education, beginning a trend that will likely continue into other states with large immigrant populations. Thus, additional stress is placed on state-funded ESL programs, where, e.g., the state of Arizona spent $211 million during the 1998–99 academic year. Thus, a time- and cost-effective method for teaching language is clearly needed for both ESL and foreign language students.

In the corporate market, foreign language acquisition products are also in demand. Due to international expansion, corporations increasingly require personnel who speak more than one language. As world economics are based on a global marketplace, corporations are quickly establishing an international presence in multiple countries, thus requiring bilingual or multilingual capabilities from personnel at all levels.

Conventional Language Acquisition Methods

Numerous methods are known for teaching and learning language, including "foreign" (i.e., second, third, etc.) languages for non-native speakers, as well as remedial training for children with impaired speech or language. The methods for second/foreign language teaching include grammar-translation, audio-lingual (ALM), and communicative methods. Such traditional methods suffer from a number of drawbacks.

For example, the grammar-translation method, a language teaching method derived from traditional approaches to the teaching of Latin and Greek in the nineteenth century, is still used today to teach reading, writing and written translation In the grammar-translation method, students are taught both to develop the ability to read well-known and prestigious literary texts, as well as to read and write the target language accurately. The main features of the grammar-translation method are: a meticulous analysis of the target written language, particularly, its grammar, explicit presentation and study of grammar rules; bilingual word lists for learning vocabulary; extensive use of translation exercises; use of a speaker's native language as the medium of instruction for the target language. The inherent drawback to this method of teaching language is that it does not serve any utilitarian goal, as little attention is given to development of speaking and listening skills, both of which are essential components to an individual's practical language skills.

Another traditional method for language teaching, developed in the United States following World War II, is the audiolingual (also known as ALM, or "aural-oral" method), which has been shown to result in rapid acquisition of speaking and listening skills for the purpose of good pronunciation. The audiolingual method focuses on pronunciation and is largely based on several main principles: speaking and listening competence precedes competence in reading and writing; the use of the mother tongue is discouraged in the classroom; and language skills are a matter of habit formulation, so students should practice particular patterns of language through structured dialogues and drills until the language is sufficiently rehearsed for responses to be automatic. The problem with the audiolingual method of language learning is that learners become skilled at pronouncing the new language, but often find themselves unable to understand native speakers.

The communicative approach was developed in the 1980s and 1990s in response to, and following perceived failures of, the audiolingual method, which failed to stress the communicative uses of language. The communicative approach focuses primarily on the interactive nature of communication and involves an attempt to recreate the natural setting, emphasizing the learner's ability to use the language appropriately in specific situations, so as to make the learner "communicatively competent". One of the main challenges of the communicative approach is to integrate the functions of a language ( conveying and requesting information, problem solving, social exchanges) with the correct use of structures, i.e., how communicative fluency may be combined with linguistic accuracy. In an effort to meet this challenge, teachers of the communicative approach organized teaching units according to the communicative "notions" a learner requires in order to communicate successfully. Such "notions" are employed on a regular basis by people in performing various functions in various situations. For example, people will apologize for being late. Concepts of notions include, e.g., time, frequency, motion, quantity, and location. Notions are less directly correlated with lexical items. For example, the notion of possession may be expressed by a verb (to have), a prepositional construction (of+nominal group), a genitive case or a possessive pronoun. The problem with the communicative approach is that it is meant to "recreate" the natural environment in the classroom; however, the classroom is not a 24-hour 7-day a week experience and thus lacks sufficient real-world feedback to facilitate language acquisition sufficiently.

DEFINTIONS

As used herein, the following terms have the meaning given below:

"Article"—The term for a word used with a noun that shows if something is definite or not. In English, "a" and "an" are indefinite articles, and "the" is the definite article.

"Automatic processing"—This refers to the performance of a task without conscious or deliberate effort, making use of knowledge in long-term memory.

"Determiner"—The term used for a word used with a noun that limits its meaning in some way. For example, in the noun phrase "the dog", "the" is the determiner.

"Explicit"—The term for the direct manner in which the meaning of the core vocabulary words in each lesson is taught.

"Foreign language"—A language that is learned where the language plays no major role in the community and is learned primarily in the classroom. For example, French learned in the United States is learned as a foreign language.

"Implicit"—The term for the indirect manner in which the structure of the language is taught, without explanation of rules for the language.

"Language skills"—The term that describes the four ways language can be used: reading, writing, listening, and speaking.

"Native-like proficiency"—The ability to speak, listen, read, and write like a native speaker of some language.

"Phrasal structure"—The term used to describe groupings of words, such as "a book" and "is reading".

"Productive skills"—The term generally used to describe speaking and writing.

"Receptive skills"—The term generally used to describe listening and reading.

"Second language"—A language that is learned in a country in which the language plays a major institutional and social role in the community. For example, English as a second language is learned in the United States, England, South Africa, Australia, etc.

"Translation"—The use of the native language to explain the foreign/second language meaning.

"Vocabulary"—This term includes single words ("book", for example), compound words ("bookmark", for example), and idioms ("give up", for example).

"Word"—As used herein, this term may refer to either a word or a phrase comprising more than one word.

SUMMARY OF THE INVENTION

The present invention provides a system and method for training processes in second language learners that are automatic for native speakers. The method assumes the following hierarchy of language acquisition skills: listening precedes speaking, reading is dependent on understanding the relationship between sounds and spelling, and writing follows the ability to read. Methods for learning foreign language consistent with the invention are based on the novel notion that certain concepts from psycholinguistic research have applicability to pedagogy.

The four aspects of the present invention that distinguish the invention from known language acquisition methods are: identifying the differences in automatic language function between native and nonnative speakers of a language; building the base components of language necessary for effective listening and speaking; avoiding any translation from the native language, (use of the native language creates interference and slows down processing time); and using a technology platform to accomplish the large number of repetitions and automation that are essential for long-term, comprehensive language skills. In one variant of the method consistent with the invention, software running on a conventional personal computer is employed, either alone or in conjunction with workbook-type printed materials, thereby enabling the learner to practice and use the language as it is being acquired.

The present invention derives in part from research that reveals the differences between native and nonnative speakers of a language. This superficially resembles the contrastive analysis technique of the early 1970s, which made linguistic comparisons of two languages in attempt to predict the difficulties of second language learners based on the similarities and differences between the native language of the learner and the language being learned. Instead, the method of the present invention focuses on differences in automaticity between native and nonnative speakers and trains language learners to automatically recognize the sounds and core vocabulary of a language. In addition, the method of the present invention implicitly trams basic grammatical structures using the already-trained core vocabulary before moving to larger contexts. As a result, learners will experience significant improvement, including functional use of grammatical structure, as well as the ability actually to speak the language and engage in meaningful dialogues with others.

In one embodiment, the method of the present invention incorporates a series of software programs that facilitate the building of automatic processes necessary for functional language use. Initially, the software trains the basic subcomponents of language, such as sounds, words, and short phrases, and builds upon that foundation for each subsequent program in a series. The software requires no prior knowledge for use or comprehension of the material, thereby making the instruction appropriate for individuals of any age group or educational background. The method of the present invention emphasizes listening and speaking skills first, while emphasizing reading and writing skills after the learner has built a substantial knowledge base. Additionally, the method has applicability universally, to speakers of any language, since no translation is involved in the acquisition process. Thus, the present invention has utility for teaching any language and is appropriate for learners of all ages and backgrounds, since a method consistent with the invention may be used even at the most basic level of language acquisition, and thus, the learner requires no prior knowledge of the language.

It is contemplated that the invention has utility in the educational, corporate, governmental and consumer markets. Educational market applications include institutions worldwide, such as elementary, secondary, and college level courses teaching foreign languages. Corporate market applications include companies participating in a growing global market, with rapid international expansion requiring bilingual/multilingual personnel. Governmental market applications include governmental agencies dealing with foreign affairs, the diplomatic and intelligence community, and the military. Consumer market applications include individuals who travel abroad, relocate, want to learn another language, and students wishing to "test out" of a college language requirement. The methods of the invention may be embodied in various language acquisition programs, e.g., English as a second language (ESL), English as a foreign language (EFL), Spanish, French, Russian, Japanese, or Mandarin Chinese. Other embodiments of the invention may employ special purpose programs, e.g., for needs of a particular job or field, such as science or law, so as to allow the learner to develop special skill sets. The invention may be embodied in various tangible media, e.g., CD-ROM.

In one aspect, a method for teaching a language, consistent with the invention, comprises: (a) while displaying to a learner a graphical representation of a vocabulary item comprising at least one word, playing to the learner an audio recording comprising the spoken form of the vocabulary item; and (b) while displaying to a learner both a graphical representation of the vocabulary item and the written form of the vocabulary item, playing to the learner an audio recording comprising the spoken form of the vocabulary item.

In another aspect, a method for teaching a language, consistent with the invention, comprises: successively presenting each of a set of words or phrases to a learner by having the learner hear the words or phrases spoken while viewing corresponding graphical icons visually representing the words or phrases; successively presenting each of the set of words or phrases to the learner by having the learner hear the words or phrases spoken while viewing both corresponding graphical icons visually representing the words or phrases and the written form of the words or phrases; and successively presenting each of a set of sentences and/or short phrases to the learner, each the sentence and/or short phrase comprising at least one word or phrase of the set of words or phrases, by having the learner hear the sentences and/or short phrases spoken while viewing corresponding graphical icons visually representing the sentences and/or short phrases.

In apparatus form, a system for teaching a language, consistent with the invention, comprises a computer system having a screen, an audio output device, and at least one memory device; a set of vocabulary items stored in the memory device, each vocabulary item comprising at least one word; a first set of machine-readable instructions stored in the memory device, the first set of machine-readable instructions for displaying on the screen a graphical representation of one vocabulary item, and substantially simultaneously playing via the audio output device an audio recording comprising the spoken form of the vocabulary item; and a second set of machine-readable instructions stored in the memory device, the second set of machine-readable instructions for displaying on the screen a graphical representation of one vocabulary item and the written form of the vocabulary item, and substantially simultaneously playing via the audio output device an audio recording comprising the spoken form of the vocabulary item.

In another aspect, a system for teaching a language, consistent with the invention, comprises a computer system having a screen, an audio output device, and at least one memory device; stored data comprising a set of vocabulary items stored in the memory device, a plurality of audio files, and a plurality of graphics files, each vocabulary item comprising at least one word, at least one the audio file corresponding to and comprising a spoken representation of each vocabulary item, at least one graphics file corresponding to and comprising a visual representation of each vocabulary item; a first set of machine-readable instructions stored in the memory device, the first set of machine-readable instructions for selecting one vocabulary item from the set of vocabulary items and reading the item and the corresponding graphics file and the corresponding audio file from the memory device; a second set of machine-readable instructions stored in the memory device, the second set of machine-readable instructions for displaying on the screen the graphics file corresponding to the selected vocabulary item, and substantially simultaneously playing via the audio output device the audio file corresponding to the selected vocabulary item; and a third set of machine-readable instructions stored in the memory device, the third set of machine-readable instructions for displaying on the screen the vocabulary item and the graphics file corresponding to the selected vocabulary item, and substantially simultaneously playing via the audio output device the audio file corresponding to the selected vocabulary item.

In a further aspect, a system for teaching a language, consistent with the invention, comprises a computer system having a screen, an audio output device, and at least one memory device; stored data comprising a set of vocabulary items stored in the memory device, a plurality of audio files, and a plurality of graphics files, each vocabulary item comprising at least one word, a plurality of the audio files corresponding to and comprising spoken representations of each vocabulary item spoken by a plurality of speakers, at least one graphics file corresponding to and comprising a visual representation of each vocabulary item; a first set of machine-readable instructions stored in the memory device, the first set of machine-readable instructions for selecting one vocabulary item from the set of vocabulary items and reading the item and one corresponding graphics file and one corresponding audio file from the memory device; a second set of machine-readable instructions stored in the memory device, the second set of machine-readable instructions for displaying on the screen the graphics file corresponding to the selected vocabulary item, and substantially simultaneously playing via the audio output device the audio file corresponding to the selected vocabulary item; a third set of machine-readable instructions stored in the memory device, the third set of machine-readable instructions for displaying on the screen the vocabulary item and the graphics file corresponding to the selected vocabulary item, and substantially simultaneously playing via the audio output device the audio file corresponding, to the selected vocabulary item; a fourth set of machine-readable instructions stored in the memory device, the fourth set of machine-readable instructions for executing the second and/or third set of machine-readable instructions a plurality of times for the vocabulary item, wherein the audio files corresponding to and comprising spoken representations of each vocabulary item spoken by different speakers, selected from the plurality of different speakers at random, are played over the course of the execution a plurality of times; and a fifth set of machine-readable instructions stored in the memory device, the fifth set of machine-readable instructions for executing the first, second, third, and fourth sets of machine-readable instructions for each vocabulary item of the set.

In yet another aspect, a method for teaching a language, consistent with the invention, comprises: presenting, in rapid succession, each of a set of words or phrases to a learner by playing for the learner audio recordings of the words or phrases, while substantially simultaneously showing to the learner corresponding graphical icons visually representing the words or phrases; wherein the native language of the learner is not employed at any time during the performance of the method, and wherein the language being taught is the exclusive language used during the performance of the steps of the method, with the exception of providing instructions for the learner in the native language of the learner that the learner must follow in order to learn using the method.

In still another aspect, a method for teaching a language, consistent with the invention, comprises: presenting, in rapid succession, each of a set of words or phrases to a learner by playing for the learner audio recordings of the words or phrases, while substantially simultaneously showing to the learner both corresponding graphical icons visually representing the words or phrases and the written form of the words or phrases; wherein the native language of the leafier is not employed at any time during the performance of the method, and wherein the language being taught is the exclusive language used during the performance of the steps of the method, with the exception of providing instructions for the learner in the native language of the learner that the learner must follow in order to learn using the method.

BRIEF DESCRIPTION OF THE DRAWINGS

FIG. 16 is a screen view illustrating an exemplary second segment in an exemplary Day 5 of one week of a multi-week language acquisition program consistent with the invention;

FIG. 17 is a table listing ninety exemplary vocabulary words that are taught in Days 1–3 and tested in Day 4 of an exemplary first week of a multi-week language acquisition program consistent with the invention;

FIG. 18 is a table listing fifty exemplary sentences/short phrases that are taught in Day 5 of an exemplary first week of a multi-week language acquisition program consistent with the invention; and FIG. 19 is a table listing the lesson contents of an exemplary fifteen-week language acquisition program consistent with the invention.

DETAILED DESCRIPTION OF THE EMBODIMENTS

Figure 1:
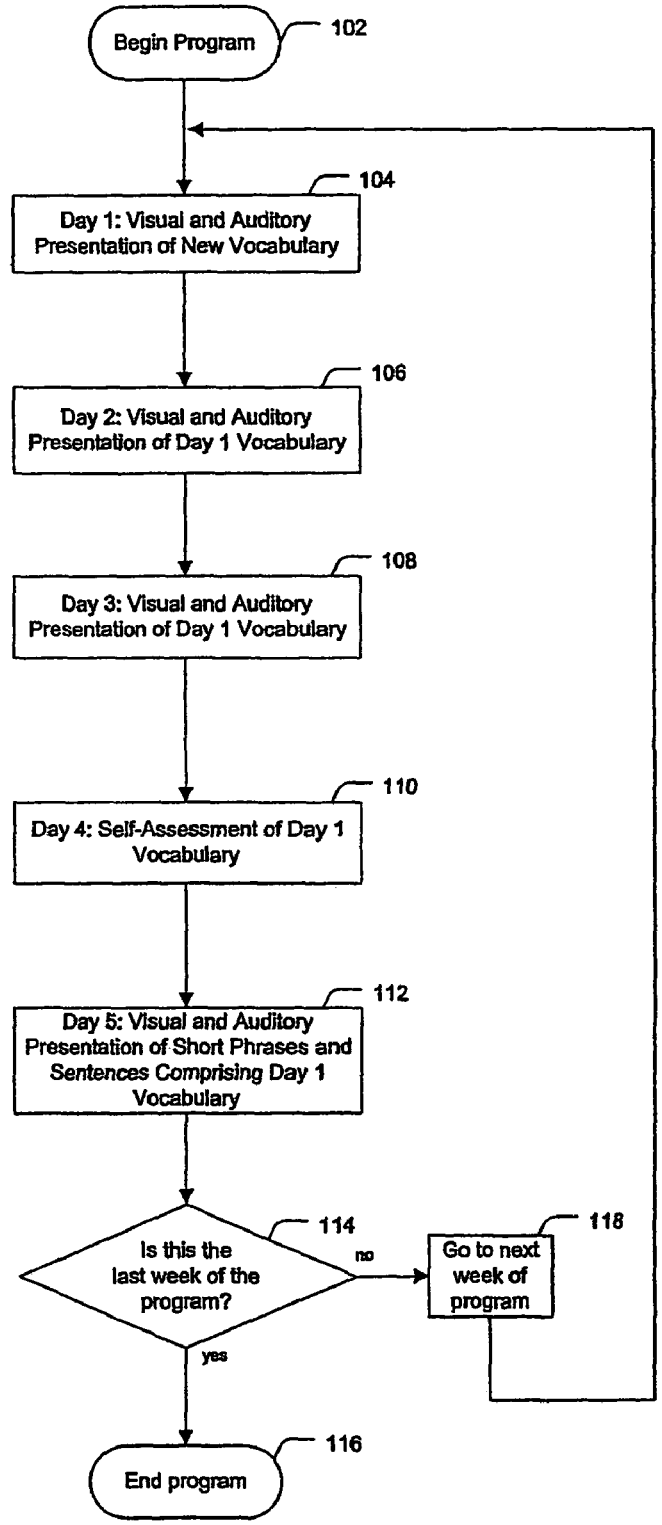
FIG. 1 is a flowchart illustrating an overview of an exemplary multi-week, five-days-per-week language acquisition program consistent with the present invention.

In one exemplary embodiment, the software portion of the invention is stored on four CD-ROM discs, each disc containing 15 weeks of lessons stored as executable software, to be used for approximately 30 minutes per day, five days per week, for a total of 40–45 hours per disc. In this scenario, the four exemplary discs are as follows: The software of an exemplary first disc explicitly teaches about 1350 vocabulary words and phrases, as well as implicitly teaching the sound and spelling system and basic grammatical structures of the language. It is intended to move learners out of the novice level of proficiency in listening, speaking, reading, and writing. The software of an exemplary second disc is intended for the intermediate learner, will introduce another about 1300 vocabulary words and phrases, enhancing academic vocabulary, and move the learner through more complex grammatical structures and expressions. The software of an exemplary third disc will again include over about 1000 new vocabulary words and expressions, including idiomatic expressions, and is intended to allow the working adult the opportunity to function in the second language. The software of an exemplary fourth disc, with another about 1000 words, is intended for the advanced language learner. For ESL/EFL students, it will also prepare them for the Test of English as a Foreign Language (TOEFL) Examination, a standardized test widely used to measure the English-language proficiency of foreign students wishing to enter American universities. In this embodiment, the software may contain various types of presentations corresponding to each lesson, e.g., vocabulary and structure presentations, auditory presentations, visual presentations, and combinations of the foregoing. The software may be used alone or with a workbook (which may enhance effectiveness due to continued exposure to the materials trained in each lesson, thereby strengthening the long-term retention of the language), An exemplary weekly lesson begins with a presentation of 90 new vocabulary items, which total 1,350 when compounded over an exemplary 15-week program. New words and phrases may always be presented in the same manner, so the learner is quickly familiar with the method, thus lowering he anxiety often associated with foreign language learning.

In a method consistent with the invention, the same program teaching English in the U.S. as a second language can be used globally to teach English as a foreign language. As demonstrated by research, a piece of information requires approximately 16 to 20 repetitions to be committed to long-term memory. With the computer as the platform for instruction instead of an instructor, this large number of repetitions can be quickly and easily achieved, which greatly accelerates the learning process. The computer also allows for multiple speakers that pronounce each word so that students understand a range of slightly different pronunciations for a word.

Advantageously, the method of the present invention places the onus of teaching on the materials, which may be embodied in one or more of the following media: computer systems, other hardware and/or software-based systems, paper-based textual materials (e.g., flash cards, workbooks), videocassettes, video discs, DVDs, multimedia (e.g., Microsoft PowerPoint™), slides, recorded digital and/or analog audio (e.g., DAT, audio cassette, compact disc, compressed digital audio files), etc. The responsibility of presentation is thereby removed from the individual(s) overseeing the process (e.g., professor or teacher). The method is further characterized in that it is not directed at different learning styles, since research supports that functional communication in any language is dependent on specific automatic processes. Automatic recognition of small subcomponents (e.g., sounds, and then words) leads to the ability to combine them into larger grammatical structures (e.g., phrases), which leads to the ability to create sentences, and so on.

First Principle Underlying the Invention:
Sufficiency of Core Vocabulary

Learning one's native language is rarely difficult or problematic: children just do it. In general, all they need is exposure to a language and they learn it. By the age of six, they have a vocabulary of roughly 13,000 words and have mastered the "rules of grammar". This is not the experience, however, of most second language learners. After some "critical age", learning a second or foreign language is tedious, frustrating, and even after many years, rarely results in native-like proficiency. Thus, there is a stark contrast between successful learning of the first language and only marginally successful learning of a second language. There are some obvious differences between the two situations: the age of the learner, the needs of the learner, and the communicative context of learning. Those in the business of teaching a second language have taken this latter point seriously. Currently in vogue is the strategy of teaching language in the "context of communication", using whole texts or dialogues, following the rationale that this is how children learn. The rationale is that children are not presented with random vocabulary words; they hear sentences and they hear them in the context of some event in the world that they are able to perceive.

However, the problem in using this approach with second language learners is that it is too often done without enough exposure to vocabulary; the second language learner is bombarded by a series of unfamiliar words and ultimately gets very little out of the experience, as they can neither learn the new vocabulary words nor the grammar structures that contain them. The point about first language acquisition that many language teaching practitioners have failed to appreciate is that although young children do indeed hear full sentences in context, they have already had at least a year of very rich exposure to the core vocabulary and sound system of the native language. The importance of building a foundation of spoken words has support from researchers, who have argued that the greatest impediment to good listening skills in a second language is poor vocabulary. Language learners need a firm foundation of spoken words before they can get anything out of entire narratives or texts, and this belief is reflected in the approach of the present invention. In exemplary initial lessons consistent with the invention, 90–100 words per week are taught, and each word is repeated 16–21 times, thereby building a solid base of spoken words.

Second Principle Underlying the Invention:
Avoiding Translation

A second major problem with current language pedagogy is that too much reliance is often placed on translation. In language classes, second language vocabulary is typically paired with translations into the learner's native language. Software packages for language instruction make the same mistake: the native language is used as a teaching tool. Recent research has shown that the use of the native language interferes with the use of a second language, and the present invention omits the native language from the teaching process altogether, thereby avoiding "competition" from the native language.

Third Principle Underlying the Invention:
Automatic Processing

A third problem with conventional language acquisition relates to failures of automatic processing. When people converse in their native language, there are many subconscious processes that come into play. Listening and understanding comprises the steps of identifying words (given an unbroken stream of speech), combining their meanings, taking into account various "grammatical" aspects of the utterance (e.g., the order of words), and so forth. Much of this work is performed quickly and without thinking, which is fortunate, since this allows time to think about the meaning of an utterance (extracting and conveying meaning is, after all, the goal of communication; language is just the medium used).

Psycholinguistics, as a field, has developed an enormous number of techniques for examining sentence production and comprehension ("sentence processing") during processing, using timing measures, for example, to examine the time it takes to initiate an utterance, to recognize a word, or to understand a complex sentence. One assumption behind much of the work in this area is that years of speaking and understanding have resulted in the automaticity of the cognitive routines that are required to comprehend language (that is, to recognize the words in an unbroken stream of speech, to understand what each word means, and to figure out what the particular sequence of words means) and to produce language (given an intended meaning, to find the appropriate words and put them in the right order). This automaticity allows one to focus one's attention on the content of what one says and hears, just as automaticity in driving a car allows one to focus one's attention on the surrounding traffic and turns in the road, rather than on the proper way to shift gears.

In short, for most people, the mechanics of language have become automatic. The only way for processes to become automatic, whether it is communicating in a new language or learning to drive a car, is through practice and repetition. Therefore, the present invention provides the learner with many more exposures to the same words and phrases (and eventually sentences, dialogues, texts) than they are typically given in other language learning situations, so as to develop automatic recognition of base components of the target language.

Fourth Principle Underlying the Invention: Initial Emphasis on Listening

A fourth problem with conventional language acquisition methods is an emphasis on speaking. Ultimately, of course, learners need to practice speaking before they will perform adequately in everyday communicative contexts. Initially, however, learners may find it difficult and embarrassing to utter new sounds and words, and this could impede the learning process. At the early stages of learning, the emphasis need not be on speaking, because honing listening skills carries over to production. For example, research has demonstrated that training people to discriminate the foreign sounds they hear not only improves how well learners hear the sounds of the new language, but also improves how well they say the new sounds. For this reason, the present invention principally emphasizes listening skills from the outset, thereby improving production by improving perception.

General Methodology

Following the foregoing four principles, the present invention comprises a training method that, in one embodiment, begins with the presentation of pictures of basic vocabulary items. At first, the pictures are paired with auditory tokens of the new labels so that students can learn the spoken versions before they see the printed version. This is important for two reasons: (a) many target learners know how to read in their native language and will be tempted (unconsciously) to read the second language word with their native language pronunciation; and (b) for European languages (including English), the sound systems differ more than the alphabetic (or "orthographic") systems, so students need more exposure to spoken language. By following the spoken version with the spoken+written version, students are implicitly taught how to read in the second language.

Throughout the learning process, students are encouraged to utter the words they hear, not to focus on their productions, but because vocalizing facilitates learning. During this initial period of intensive vocabulary training, students have regular opportunities to test their knowledge. Self-testing may occur (e.g., at the beginning of a session, on the fourth day of each five-day session), or may not occur at all, since the method of the present invention does not require any form of testing in order for the method to succeed. In a method consistent with the invention, it may be desirable for students to be tested "cold", i.e., after at least a day's absence, since, if they have just been practicing the vocabulary to be tested, these items may still be in what is referred to as "short term memory", rather than "long term memory". Students may be presented with three different ways to self-test vocabulary: (1) a number of icons appear visually (e.g., on a computer screen), and students are asked to say the word corresponding to each icon; (2) a word is presented auditorily (e.g., through headphones), and students must match it to one of a number of icons; and (3) a word is presented visually (e.g., on a computer monitor), and students must match it to one of a number of icons. After training a base of 90 words, combinations of these words are presented in short phrases and sentences, and then students may be allowed to self-test again, using the same or similar methods as for the words. One or more of the methods may require modification, e.g., since any given icon could conceivably correspond to an infinite number of multi-word descriptions, and the learner should not be expected to determine which is appropriate without being provided a list from which to choose. (E.g., a graphic of an exhausted-looking man sitting at a typewriter might be used to represent "he is working" or "the man is typing" or "the businessman is tired", etc.)

Exemplary Five-Session General Embodiment

An exemplary language acquisition program or method consistent with the invention comprises one or more (e.g., 15) lessons. Each lesson is subdivided into a number of sessions to be used at predetermined intervals (e.g., a lesson comprising five days, to be used daily during five different days). Each lesson is designed to teach a set of core vocabulary words (e.g., 90), alone or in phrase and/or sentence combinations, as well. The core vocabulary words for the lesson are used in all of the sessions of that lesson, and the teaching of those words become the base for the implicit teaching of grammatical structures. The learner's native language is never used, and the fact that the words of the lesson are taught without reference to or need for the learner's native language facilitates faster processing (recognition, identification) of the new language vocabulary by eliminating interference from the native language.

In the fist session of this exemplary embodiment, the core vocabulary words are taught using simultaneous, sequential, and rapid presentation of all of the words (e.g., 90 words/phrases in 3 minutes). For example, the learner sees (e.g., on a computer screen) a graphic of a dog and hears, "a dog" (e.g., through a speaker or headphones) at same time. Students are presented with "a dog" in the auditory presentation, so that the phrasal structure (article+noun), for example, is taught implicitly while explicitly teaching the new label (the word "dog"). For languages with gender, such as Spanish and most European languages, this facilitates gender identification implicitly and automatically. The learner hears all of the core vocabulary words for that lesson spoken by a first speaker, while viewing graphics corresponding to those words. Next, the learner hears all of the core vocabulary words for that lesson spoken by a second speaker, while viewing graphics corresponding to those words, and the same may be repeated for a third speaker, fourth speaker, etc. Because there is variability between native speakers of every language, each word is spoken by multiple speakers so that the learner's brain adapts to the multiple regional accents and personal speech styles or anomalies of native speakers. The set of words may then be presented several more times (e.g., 3), in the same manner, or alternatively, with randomization of order of presentation and speaker. During the first session, the written form is not presented to the learner, so as to prevent potential interference of native language orthography/sound relationship. It is advantageous to the learning process if each word is heard by the learner about 7 times during the first session, and if the session comprises at least 4 native speakers speaking approximately 90 words, over approximately 30 minutes. In this manner, the learner develops a new lexicon.

In the second session of this exemplary embodiment, the language acquisition techniques of the first session are repeated in a similar manner, i.e., the core vocabulary words are taught using simultaneous, sequential, and rapid presentation of all of the words (e.g., 90 words/phrases in 3 minutes). The main difference in the second session is the integration in the second session of written forms of the core vocabulary words. The learner sees the written form of the words (e.g., on a computer screen) for the first time, for all vocabulary words in the lesson. The written form of each word/phrase heard is displayed along with the graphic, while the learner hears the word spoken. Presentation of the words and speakers may be random in the second session, or may be ordered, as in the first session. As with the first session, the learner hears all words spoken a number of times, e.g., (hearing each of 90 words 7 times, over about 30 minutes). The written form is added in the second session to help learners begin to learn the relationship between the orthography (spelling) and the sound system of the language. The goal of the present invention, in its various embodiments, is to make the base components of language "automatic". This is done with the understanding that those who must stop and think before understanding what they hear are not functional in the language, much less competent. Native speakers of all language speak quickly (at a rate of about 3–4 words per second), and thus, in order for second language learners to function in that language, they must process language quickly.

In the third session of this exemplary embodiment, the language acquisition techniques of the second session may be repeated in a similar manner, wherein learners see the graphical representation of a word/phrase plus the corresponding written word/phrase on the screen, while hearing it being spoken (e.g., through headphones). Again, multiple speakers (e.g., 4) may be used, each repeating each word/phrase a number of times (e.g., 7), over approximately 30 minutes. This additional repetition for reinforcement is based, in part, on research that indicates students need to be exposed to a new vocabulary word 20 times for it to become part of long-term memory. Additionally, although students are not instructed to repeat what they hear in the first three sessions (and repetition is not an explicit component of the present invention), a pilot study employing software enabling a method consistent with the invention showed that people naturally do so anyway, as all 24 participants in the study were observed repeating what they heard without explicitly being instructed to do so.

The fourth session of this exemplary embodiment is for self-testing, whereby a learner may find out whether or not he or she has learned the words. The self-testing may comprise one or more of the following three tests: listening comprehension test, reading comprehension test, and pronunciation test. For the listening comprehension test, the learner matches words/phrases heard to the corresponding graphic (e.g., on a computer screen). For example, the learner may be instructed to click on a generic graphic appearing on one side of the screen to hear a word, and then click on the icon on the other side of the screen matching that word. Words might be grouped according to how they sound so that students would be required to know fully precisely what each word sounds like. If the match is correct, the learner is given proper feedback, e.g., by making the generic and corresponding graphics disappear, or by otherwise distinguishing the correctly identified graphic. This is done for all the words in the lesson to test the learner's auditory recognition of each word. For the reading comprehension test, the learner matches written words/phrases (e.g., displayed on screen) to the corresponding graphic (e.g., displayed on a computer screen). For example, the learner may be instructed to click on a written word/phrase appearing on one side of the screen to hear a word, and then click on the icon on the other side of the screen matching that word, or drag the word/phrase onto the appropriate graphic. If the match is correct, the learner is given proper feedback, e.g., by making the written word/phrase and corresponding graphics disappear or the graphic would change in some standardized way. This is done for all the words in the lesson to test the learner's written recognition of each word. For, the pronunciation test, the learner is given the opportunity to pronounce words/phrases displayed (e.g., on a computer screen) along with the corresponding graphic (e.g., on a computer screen). For example, the learner may be presented with a set of graphics corresponding to words/phrases being tested, and may be instructed to click on the appropriate graphics to eliminate those words/phrases with which the learner is already familiar. The learner is given the opportunity to pronounce "out loud" the graphics representing the words he or she is eliminating, at which point the corresponding icon "disappears" from the screen. This is done for all the words in the lesson to test the learner's pronunciation of each word. One or more of the foregoing tests may comprise a review component, wherein, a learner may select an option for reviewing the words missed, or not recognized, using one or more techniques from the first, second, and/or third sessions. The foregoing testing sequence is based on the principle that knowing a language means: auditory recognition, written recognition, and the ability to say the word. Testing may also occur by pen and paper, e.g., using materials such as workbooks or standardized tests. While the inventors of this method believe that perceptual skills must precede production skills in language acquisition, and that automatic use of the language is necessary for functional communication, it should be understood that testing may be omitted altogether in certain embodiments of the present invention and is not central to the success of the present invention, but is explained herein only by way of example.

The fifth session of this exemplary embodiment is used to place the words/phrases of each lesson (and any of preceding lessons) in larger texts. As with the individual words/phrases of Days 1–3, short sentences and/or short phrases comprising the core vocabulary words of Days 1–3 are taught using simultaneous, sequential, and rapid presentation of all of the words (e.g., 60 phrases/short sentences in 3 minutes). The sentences/short phrases are displayed (e.g. on a computer screen) to the learner while displaying a corresponding graphic and playing a recording of a native speaker speaking the sentence/short phrase. In this manner, grammatical structures (e.g., phrasal structures, verb tenses, pronouns, question forms, and comparisons) may be taught. Additionally, small dialogues reinforce the use of the structure and vocabulary (e.g., so that first and second person can be used). The use of longer texts, such as paragraphs, or short stories incorporating the vocabulary, may be included. The fifth session typically comprises solely vocabulary that has been explicitly taught in the current or previous lessons, except for vocabulary that has no concrete sense. For example, grammatical words like prepositions, pronouns, and conjunctions must be taught in context, as well as a verb such as "loves", or other abstract words having no graphic easily identifiable to the learner. Such new words, not previously presented to the learner, may be used (sparingly) in the fifth session with the support of previous lessons and sessions, so as to make them logical and self-explanatory.

Specific Exemplary Embodiment—Fifteen-Week, Five-Days-Per-Week Cycle

Another exemplary embodiment of a language acquisition method consistent with the invention comprises one or more CD-ROMs containing 15 weeks of lessons comprising around 1350 words and phrases, which is roughly equivalent to the information one would experience in the first year of a university language class, or two years of high school language classes. In this embodiment, using the software requires a minimal time commitment of 30 minutes of time per day, 5 days per week, each day corresponding to a "session", as set forth in the foregoing described embodiment. The "Dolch" word list (or "Dolch Basic Sight Vocabulary") may be employed, which is a list of 220 words consisting mainly of function words that have little meaning on their own, but which show grammatical relationships of the words in sentences. Included in this list are conjunctions, prepositions, articles, and pronouns, as well as commonly used verbs, adjectives, and adjectives. From 50 to 75 percent of all words used in school textbooks, library books, newspapers, and magazines are in the Dolch list.

Overview of Fifteen-Week Five-Days-Per-Week Cycle

Turning now to FIG. 1, a flowchart 100 illustrates an overview of an exemplary multi-week, five-days-per-week language acquisition program consistent with the present invention. As shown, the program, comprising five-day weeks, begins at step 102. In this exemplary embodiment, on Days 1–3 of each weekly lesson, the learner builds vocabulary, learns phrasal structures, and becomes exposed to the sound system of the language. Initially, on Day 1 of the week, pictures of basic vocabulary items are paired with auditory pronunciations rapidly displayed/played (e.g., 90 words in 3 minutes), at step 104. As time progresses, on Days 2 and 3 of the week, auditory pronunciations and vocabulary icons are paired with written words in the target language, at steps 106 and 108, and are rapidly displayed/played (e.g., 90 words in 3 minutes). On Day 4, self-testing occurs, at step 110, to ensure that the information has been retained in long-term memory. On Day 5, the words from prior lessons are introduced at sentence level or above (text, dialogue, etc.), so as to teach grammar and syntax, at step 112, which occurs in a manner similarly to Days 1–3, with rapid display/play of the sentences/phrases/graphics (e.g., 60 sentences/short phrases in 3 minutes). At step 114, if it is the last week of the program, as determined at step 114, the program ends, at step 116. If further weeks of the program remain, the learner advances to the next week of the program, at step 118, and this five-day cycle repeats in this manner from week to week, each week introducing about 90 new words and phrases.

Day 1 of Fifteen-Week Five-Days-Per-Week Cycle

Figure 2:
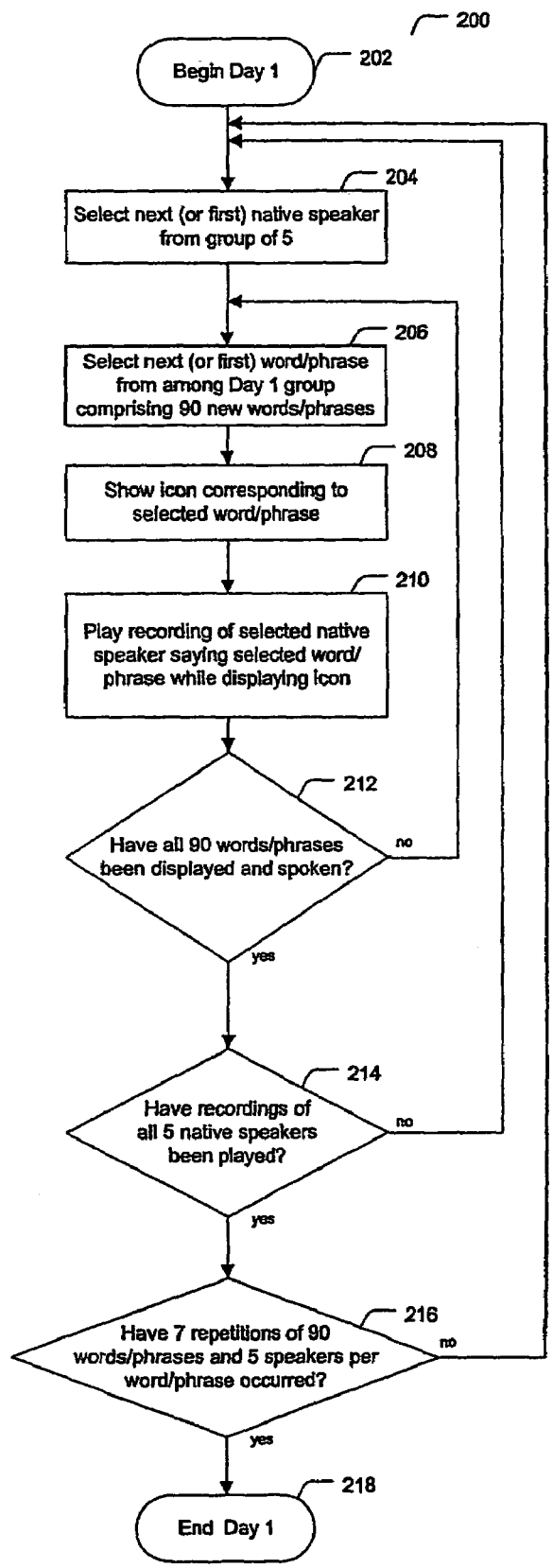
FIG. 2 is a flowchart illustrating the steps of an exemplary Day 1 of a multi-week language acquisition program consistent with the invention.

FIG. 2 is a flowchart 200 illustrating the steps of an exemplary Day 1 of a multi-week language acquisition program consistent with the invention. Day 1 comprises the presentation of vocabulary by category at phrase level. This means that, for example, where acceptable as determined by native speakers, vocabulary words are presented with a determiner, such as a definite article, indefinite article, or quantifier. This has multiple functions: First, phrases will readily be combined to form sentences: e.g. "a boy"+"is eating"="a boy is eating". Second, this type of presentation provides information about the use of singular and plural nouns (e.g. "a book" vs. "pants"). This day's lesson includes presentation of the vocabulary by category (food, transportation, etc.) and by speaker. Learners hear all the vocabulary, by category, pronounced by the first speaker, then the second, third, etc. The learner is thus exposed to 90 new words (e.g., "dog", "dogs") and phrases (e.g., "a dog", "some grapes"). Specifically, this is accomplished by playing an audio clip of the word or phrase being spoken, while simultaneously visually presenting a pictorial representation (an "icon") to the learner, one word/phrase at a time, rapidly (e.g., 90 words in 3 minutes). Each word or phrase is spoken by five different native speakers, and each speaker says all 90 words before the next voice is heard. This entire process is repeated seven (or another predetermined number of) times.

As shown, the day begins at step 202. The first (or next) native speaker is selected from the group of five native speakers, at step 204. The first (or next) word or phrase is selected from among the Day 1 group comprising 90 new words and phrases, at step 206. The icon corresponding to the selected word or phrase is shown, at step 208, and simultaneously, a recording is played for the learner, the recording comprising the selected native speaker saying the selected word or phrase, at step 210. If all 90 words/phrases have not yet been displayed and spoken by the currently selected native speaker, which determination is made at step 212, control returns to step 206 for selection of the next word or phrase. If all 90 words/phrases have been displayed and spoken by the currently selected native speaker, as determined at step 212, a further determination is made whether recordings of all five native speakers have been played, at step 214. If not, control returns to step 204 for selection of the next native speaker. If recordings of all five native speakers have been played, as determined at step 214, a further determination is made whether seven (or another predetermined number of) repetitions of 90 words/phrases and five native speakers per word/phrase have occurred, at step 216. If not, control returns to step 204, and the entire foregoing process repeats in its entirety. If all 90 words/phrases have been spoken by five native speakers per word/phrase, as determined at step 216, Day 1 ends, at step 218.

Day 2 of Fifteen-Week, Five-Days-Per-Week Cycle

Figure 3:
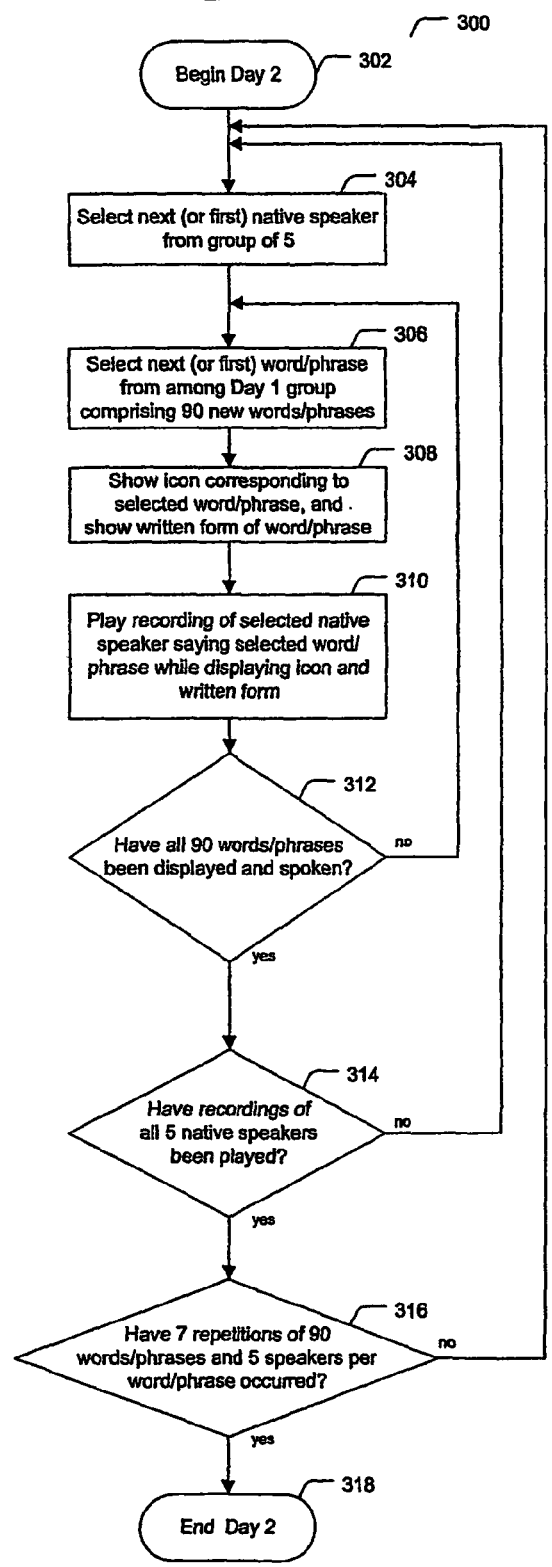
FIG. 3 is a flowchart illustrating the steps of an exemplary Day 2 of a multi-week language acquisition program consistent with the invention.

FIG. 3 is a flowchart 300 illustrating the steps of an exemplary Day 2 of a multi-week language acquisition program consistent with the invention. Day 2 comprises exposing the learner to the same 90 words and phrases as Day 1, again by playing an audio clip of the word or phrase being spoken, while simultaneously visually presenting an icon to the learner. Unlike Day 1, while the icon is shown to the learner, the written form of the word or phrase is simultaneously displayed, rapidly (e.g., 90 words in 3 minutes). As with Day 1, each word or phrase is spoken by five different native speakers, and each speaker says all 90 words before the next voice is heard. This entire process is repeated seven (or another predetermined number of) times.

As shown, the day begins at step 302. The first (or next) native speaker is selected from the group of five native speakers, at step 304. The first (or next) word or phrase is selected from among the Day 1 group comprising 90 new words and phrases, at step 306. At step 308, the icon corresponding to the selected word or phrase is shown, the written word/phrase is displayed on screen, and simultaneously, a recording is played for the learner, the recording comprising the selected native speaker saying the selected word or phrase, at step 310. If all 90 words/phrases have not yet been displayed and spoken by the currently selected native speaker, which determination is made at step 312, control returns to step 306 for selection of the next word or phrase. If all 90 words/phrases have been displayed and spoken by the currently selected native speaker, as determined at step 312, a further determination is made whether recordings of all five native speakers have been played, at step 314. If not, control returns to step 304 for selection of the next native speaker. If recordings of all five native speakers have been played, as determined at step 314, a further determination is made whether seven (or another predetermined number of) repetitions of 90 words/phrases and five native speakers per word/phrase have occurred, at step 316. If not, control returns to step 304, and the entire foregoing process repeats in its entirety. If all 90 words/phrases have been spoken by five native speakers per word/phrase, as determined at step 316, Day 2 ends, at step 318.

Day 3 of Fifteen-Week, Five-Days-Per-Week Cycle

Figure 4:
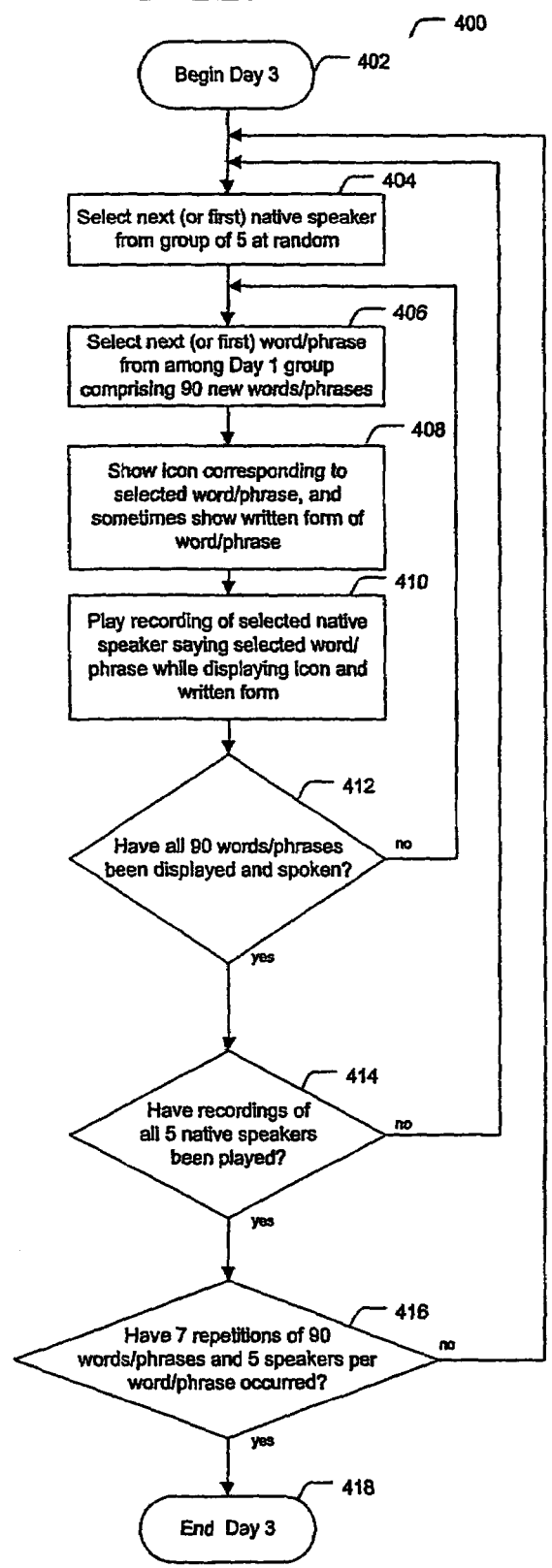
FIG. 4 is a flowchart illustrating the steps of an exemplary Day 3 of a multi-week language acquisition program consistent with the invention.

FIG. 4 is a flowchart 400 illustrating the steps of an exemplary Day 3 of a multi-week language acquisition program consistent with the invention. Day 3 comprises exposing the learner to the same 90 words and phrases as Day 1, again by playing an audio clip of the word or phrase being spoken, while simultaneously visually presenting an icon to the learner, rapidly (e.g., 90 words in 3 minutes). In certain embodiments, while the icon is shown to the learner, sometimes the written form of the word or phrase is simultaneously displayed, and sometimes the written form of the word or phrase is not displayed at all. Unlike Days 1 and 2, the words and phrases are spoken by different speakers, and the order of words/phrases, as well as the speakers, are selected at random from among the 5 native speakers. This entire process is repeated seven (or another predetermined number of) times.

As shown, the day begins at step 402. The first (or next) native speaker is selected at random from the group of five native speakers, at step 404. The first (or next) word or phrase is selected from among the Day 1 group comprising 90 new words and phrases, at step 406. At step 408, the icon corresponding to the selected word or phrase is shown, and sometimes the written word/phrase is also displayed on screen. Simultaneously, a recording is played for the learner, the recording comprising the selected native speaker saying the selected word or phrase, at step 410. If all 90 words/phrases have not yet been displayed and spoken by the currently selected native speaker, which determination is made at step 412, control returns to step 406 for selection of the next word or phrase. If all 90 words/phrases have been displayed and spoken by the currently selected native speaker, as determined at step 412, a further determination is made whether recordings of all five native speakers have been played, at step 414. If not, control returns to step 404 for selection of the next native speaker. If recordings of all five native speakers have been played, as determined at step 414, a further determination is made whether seven (or another predetermined number of) repetitions of 90 words/phrases and five native speakers per word/phrase have occurred, at step 416. If not, control returns to step 404, and the entire foregoing process repeats in its entirety. If all 90 words/phrases have been spoken by five native speakers per word/phrase, as determined at step 416, Day 3 ends, at step 418.

Day 4 of Fifteen-Week Five-Days-Per-Week Cycle

Figure 5:
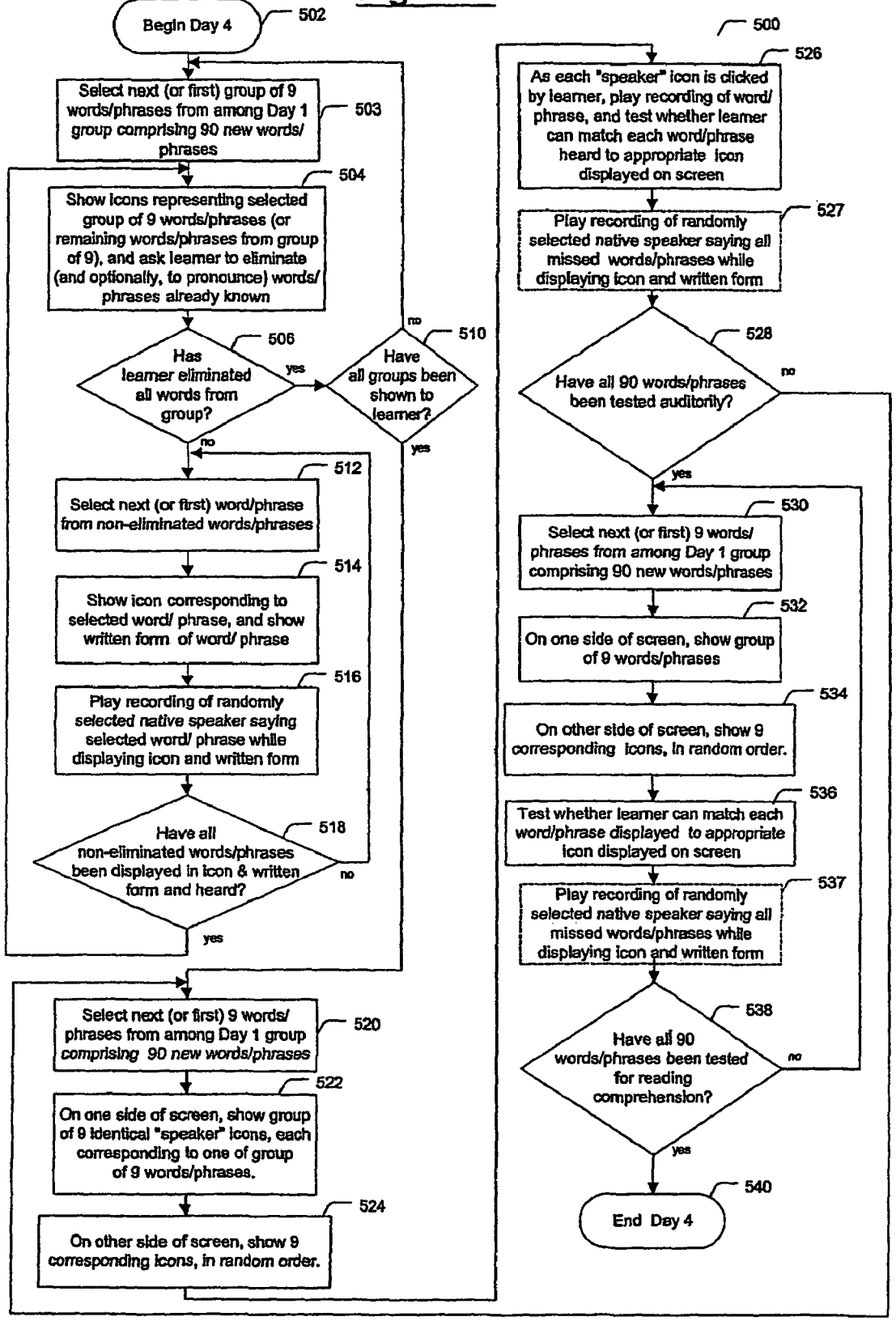
FIG. 5 is a flowchart illustrating the steps of an exemplary Day 4 of a multi-week language acquisition program consistent with the invention.

FIG. 5 is a flowchart 500 illustrating the steps of an exemplary Day 4 of a multi-week language acquisition program consistent with the invention. As shown in the flowchart 500, Day 4 comprises a self-assessment exercise. In this exercise, three self-assessment exercises are presented to the learner. First, nine icons at one time appear on the screen, and the learner is instructed to click on the icons he or she is already familiar with. The icons not selected are then represented auditorily, in icon form and in word form, as review. After all 90 icons are offered for review, the learner may self-test his or her listening comprehension, as follows: Nine speaker icons appear to the left of the screen while nine icons corresponding to words/phrases to be tested appear to the right, and the learner presses first on a speaker icon to hear a word and then presses on the icon that matches what he or she heard. Finally the learner may self-test his or her reading comprehension, as follows: nine words or phrases appear to the left of the screen while nine icons appear to the right, and the learner must drag each of the words/phrases over to the matching icon.

As shown, the day begins at step 502. Words/phrases are selected, nine at a time, from among the Day 1 group of 90 words/phrases, at step 503, and the first segment of the Day 4 session takes place, which begins with step 504, in which the learner is shown icons representing the selected group of 9 words/phrases (or, the remaining words/phrases from the group of 9), and the learner is asked to eliminate (and, optionally, to pronounce) those words/phrases from the group of 9 that he/she already knows. At step 506, a determination is made whether the learner as eliminated all words/phrases from the group. If so, a determination is made at step 510 whether all groups of 9 words/phrases have been shown to the learner. If not, control returns to step 503, and the next group of 9 words/phrases is selected. If, at step 506, it is determined that the learner has not eliminated all words from the group, i.e., one or more words/phrases remain that the learner does not know, then the first (or next) word/phrase is selected from among the non-eliminated words/phrases, at step 512. Next, at step 514, the icon corresponding to the selected word/phrase is shown, along with the written form of the word/phrase. At step 516, a recording is played of a randomly selected native speaker saying the selected word/phrase while the icon and written form are displayed At step 518, a determination is made whether all non-eliminated words/phrases from the group of 9 have been displayed in icon and written form and heard. If not, control returns to step 512 for selection of the next word/phrase. If so, then control returns to step 504 for repetition of the presentation to the learner of the remaining words/phrases from the group of 9, for elimination/pronunciation.

If, at step 510, a determination is made that all groups of 9 have been shown to the learner, the second segment of the session takes place, which begins at step 520, wherein the first (or next) group of words/phrases from among the Day 1 group comprising new words/phrases is selected. At step 522, on one side of the screen, a group of 9 identical icons (e.g., an icon of a speaker) is shown to the learner, each icon corresponding to one of the group of 9 selected words/phrases. On the other side of the screen, at step 524, the appropriate icons corresponding to the 9 selected words/phrases are shown. For each of the 9 words/phrases, at step 526, as the "speaker" icon on one side of the screen is clicked by the learner, a recording of the associated word/phrase is played (e.g., by a randomly selected native speaker), and the learner is given the opportunity to select the icon displayed on the other side of the screen that matches the word/phrase played. Optionally, at step 527, a recording may be played of a native speaker selected at random saying each of the missed words/phrases, while the corresponding icon and written form of each is displayed. At step 528, a determination is made whether all 90 words/phrases have been tested auditorily. If not, control returns to step 520 for selection of the next group of 9 words/phrases for auditory testing.

Once all 90 words have been auditorily tested, as determined at step 528, the third segment of the session takes place, which begins at step 530, wherein the first (or next) group of words/phrases from among the Day 1 group comprising new words/phrases is selected. At step 532, on one side of the screen, the written words/phrases corresponding to each of the group of 9 selected words/phrases are displayed to the learner. On the other side of the screen, at step 534, the appropriate icons corresponding to the 9 selected words/phrases are shown For each of the 9 words/phrases, at step 536, the learner is given the opportunity to select the icon displayed on the other side of the screen that matches the word/phrase played (e.g., as each word/phrase from one side of the screen is dragged to the other side of the screen onto the corresponding icon, or by sequentially clicking on the written word/phrase, then the corresponding icon). Optionally, at step 57, a recording may be played of a native speaker selected at random saying each of the missed words/phases, while the corresponding icon and written form of each is displayed. At step 538, a determination is made whether all 90 words/phrases have been tested for reading comprehension. If not, control returns to step 530 for selection of the next group of 9 words/phrases for reading comprehension testing. Once all 90 words have been tested for reading comprehension, as determined at step 538, the day ends, at step 540.

Day 5 of Fifteen-Week, Five-Days-Per-Week Cycle

Figure 6:
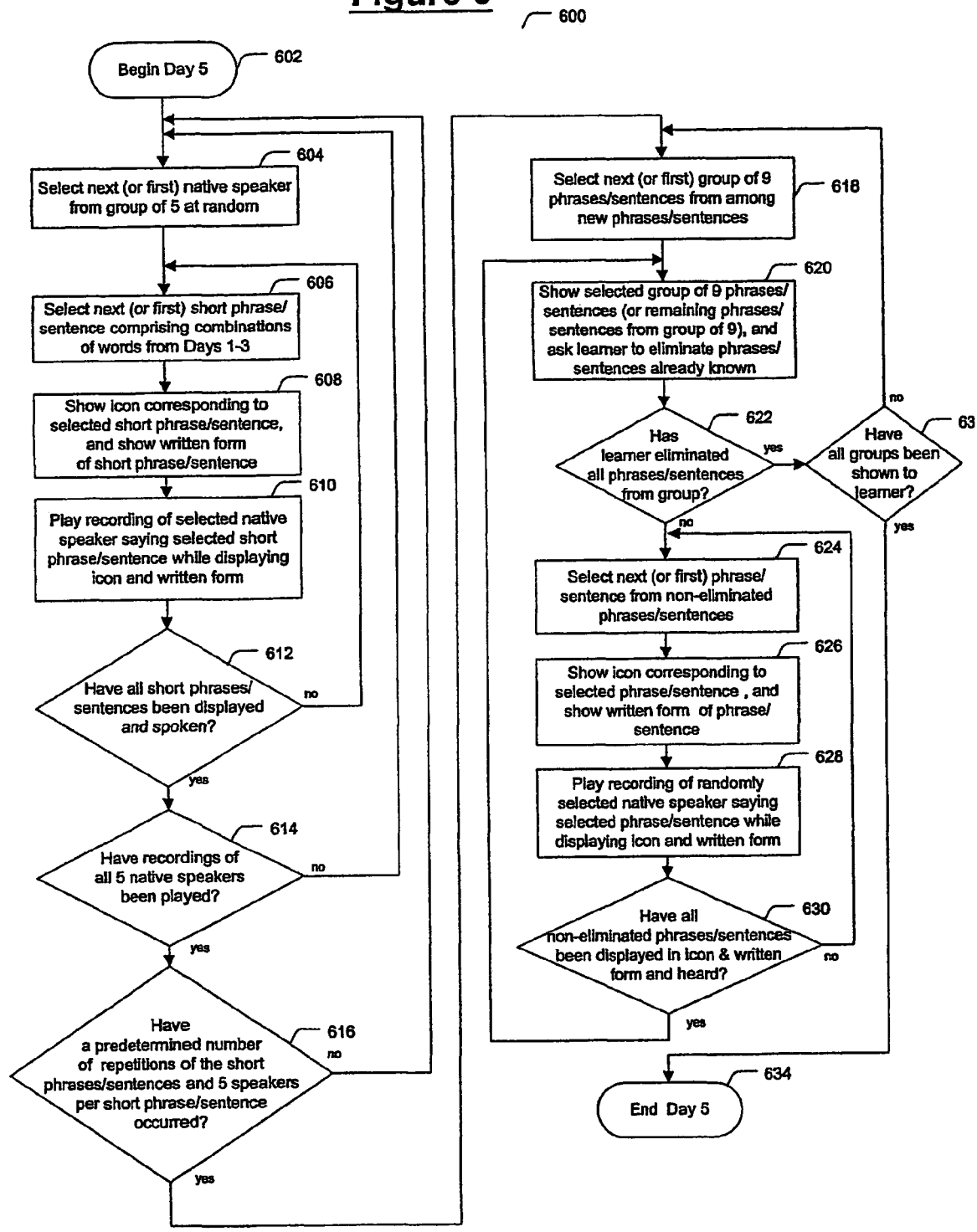
FIG. 6 is a flowchart illustrating the steps of an exemplary Day 5 of a multi-week language acquisition program consistent with the invention.

FIG. 6 is a flowchart 600 illustrating the steps of an exemplary Day 5 of a multi-week language acquisition program consistent with the invention. As shown in the flowchart 600, Day 5 differs from the other days, in that the words/phrases previously taught, trained, and self-assessed in Days 1–4 are now incorporated into short phrases and sentences, instead of isolated presentation of the words/phrases themselves. In a first segment of Day 5, as with the individual words/phrases in Days 1–3, there is multiple presentation of icons depicting each sentence/short phrase, and learners hear the sentences spoken by several native speakers. The sentences/short phrases may be presented both with and/or without the written words, and, as with Days 1–3, the presentation occurs rapidly (e.g., 60 sentences/short phrases in 3 minutes). Day 5 may also comprise a second, self-assessment segment for the short phrases and sentences, including one or more assessment methods from Day 4.

As shown, the day begins at step 602. The first segment of Day 5 begins with step 604, wherein the first (or next) native speaker is selected at random from the group of five native speakers. The first (or next) word or phrase is selected from among the group of sentences/short phrases comprising combinations of words/phrases from Days 1–3, at step 606. At step 608, the icon corresponding to the selected sentence/short phrase is shown, and the written sentence/short phrase is also displayed on screen. Simultaneously, a recording is played for the learner, the recording comprising the selected native speaker saying the selected sentence/short phrase, at step 610. If all of the sentences/short phrases have not yet been displayed and spoken by the currently selected native speaker, which determination is made at step 612, control returns to step 606 for selection of the next sentence/short phrase. If all of the sentences/short phrases have been displayed and spoken by the currently selected native speaker, as determined at step 612, a further determination is made whether recordings of all five native speakers have been played, at step 614. If not, control returns to step 604 for selection of the next native speaker. If recordings of all five native speakers have been played, as determined at step 614, a further determination is made whether seven (or another predetermined number of) repetitions of all of the sentences/short phrases and five native speakers per sentence/short phrase have occurred, at step 616. If not, control returns to step 604, and the entire foregoing process repeats in its entirety. If all of the sentences/short phrases have been spoken by five native speakers per sentence/short phrase, as determined at step 616, the second segment of Day 3 takes place.

Step 618 begins the second segment of Day 5, wherein sentences/short phrases are selected, nine at a time, from among the new phrases/sentences presented in the first segment. At step 620, the learner is shown icons representing the selected group of 4 sentences/short phrases (or, the remaining sentences/short phrases from the group of 4), and the learner is asked to eliminate (and, optionally, to pronounce) those sentences/short phrases from the group of 4 that he/she already knows. At step 622, a determination is made whether the learner as eliminated all sentences/short phrases from the group. If so, a determination is made at step 632 whether all groups of 4 sentences/short phrases have been shown to the leaner. If not, control returns to step 618, and the next group of 4 sentences/short phrases is selected. If, at step 622, it is determined that the learner has not eliminated all sentences/short phrases from the group, i.e., one or more sentences/short phrases remain that the learner does not know, then the first (or next) sentence/short phrase is selected from among the non-eliminated sentences/short phrases, at step 624. Next, at step 626, the icon corresponding to the selected sentence/short phrase is shown, along with the written form of the sentence/short phrase. At step 628, a recording is played of a randomly selected native speaker saying the selected sentence/short phrase while the icon and written form are displayed. At step 630, a determination is made whether all non-eliminated sentences/short phrases from the group of 4 have been displayed in icon and written form and heard. If not, control returns to step 624 for selection of the next sentence/short phrase. If so, then control returns to step 620 for a repetition of the presentation to the learner of the remaining sentences/short phrases from the group of 4, for elimination/pronunciation. If, at step 632, a determination is made that all groups of 4 have been shown to the learner, Day 5 ends at step 634.

Exemplary Screen Views

FIGS. 7 through 16 are exemplary screen views that a learner might see in an exemplary session of a multi-week language acquisition program consistent with the invention. It should be recognized that the screen views, which generally correspond to the embodiment described hereinabove with respect to FIGS. 1 through 6, are not to be construed as limiting the present invention to any particular screen views, and are provided merely for illustrative purposes.

Figure 7:
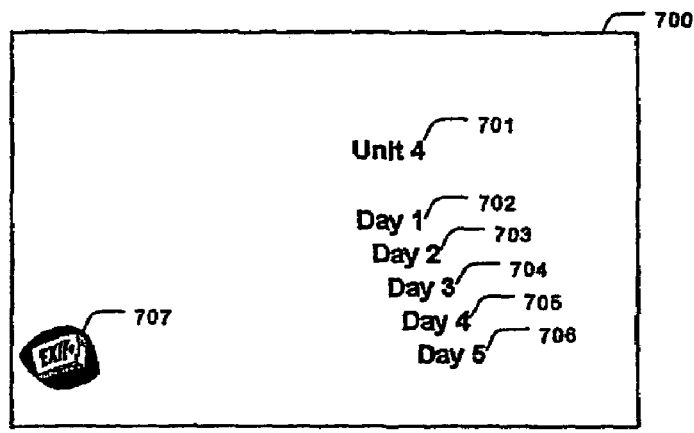
FIG. 7 is a screen view illustrating an exemplary menu screen in an exemplary fourth week (or "unit") of a multi-week language acquisition program consistent with the invention.

FIG. 7 is a screen view 700 illustrating an exemplary menu screen in an exemplary fourth week (or "unit") of a multi-week language acquisition program consistent with the invention. As shown, the unit number 701 is displayed, along with clickable choices for the five days/sessions 702–706 that the unit comprises. Similar such menus may be provided for making selections at other times, including, e.g., to select the week or unit number. Alternatively, in a software-based method consistent with the invention, the software may be appropriately adapted to store for one or more learners the progress of the learner in the overall program, thus permitting the learner to return to a point following that at which he or she left off upon his or her last use, and thereby alleviating the need for the learner to remember the current unit/week/lesson/session/day number. An "exit" button 707 or similar feature may be provided to permit the learner to elect to exit the program, depending on the embodiment of the software and its intended use (e.g., classroom, home, Internet-based, etc.).

Figure 8:
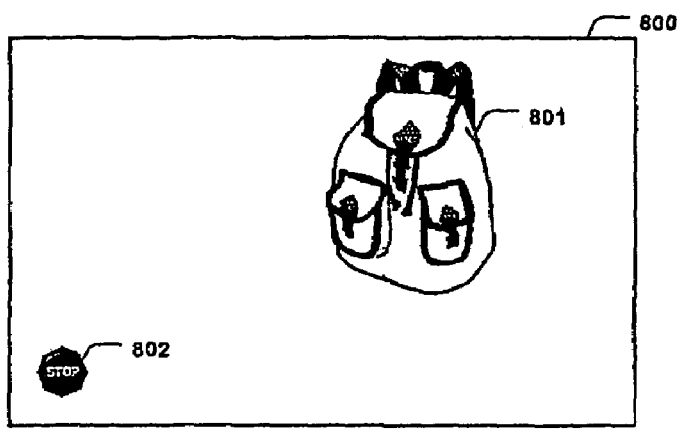
FIG. 8 is a screen view illustrating an exemplary icon view in an exemplary Day 1 of one week of a multi-week language acquisition program consistent with the invention.

FIG. 8 is a screen view 800 illustrating an exemplary icon view in an exemplary Day 1 of one week of a multi-week language acquisition program consistent with the invention. As shown, an icon 801 representing the selected word/ phrase is displayed without any accompanying text, and during this display, a recording of native speaker saying the corresponding word/phrase is played. In the screen view 800 shown, the spoken-phrase corresponding to the displayed icon 801 is "a backpack", which teaches the learner the word "backpack" plus the appropriate determiner, which is the indefinite article "a" in this case. A "stop" button 802 or similar feature may be provided to permit the learner to elect to exit the current session and return to the previous menu.

Figure 9:
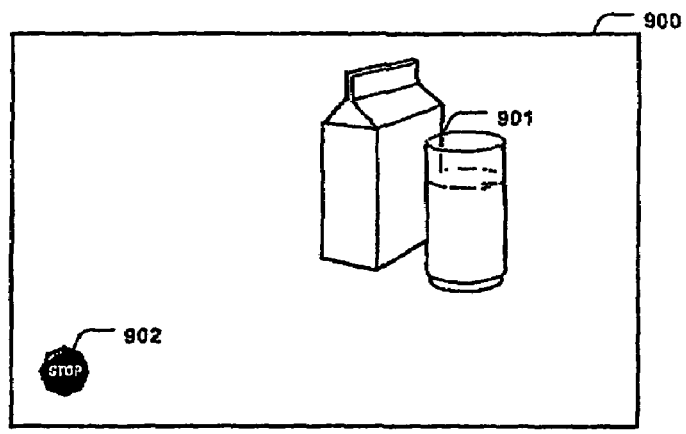
FIG. 9 is a screen view illustrating another exemplary icon view in an exemplary Day 1 of one week of a multi-week language acquisition program consistent with the invention.

FIG. 9 is a screen view 900 illustrating another exemplary icon view in an exemplary Day 1 of one week of a multi-week language acquisition program consistent with the invention. As shown, an icon 901 representing the selected word/phrase is displayed without any accompanying text, and during this display, a recording of native speaker saying the corresponding word/phrase is played. In the screen view 900 shown, the spoken phrase corresponding to the displayed icon 901 is "a glass of milk", a phrase incorporating several words at a time to be acquired by the learner. A "stop" button 902 or similar feature may be provided to permit the learner to elect to exit the current session and return to the previous menu.

Figure 10:
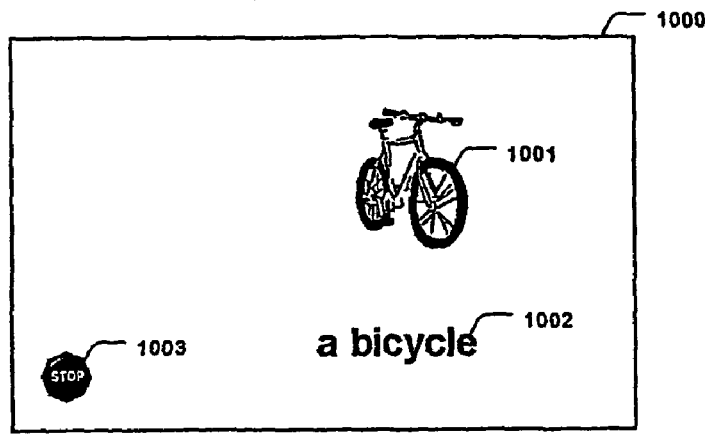
FIG. 10 is a screen view illustrating an exemplary icon and written word view in an exemplary Day 2 or Day 3 of one week of a multi-week language acquisition program consistent with the invention.

FIG. 10 is a screen view 1000 illustrating an exemplary icon and written word view in an exemplary Day 2 or Day 3 of one week of a multi-week language acquisition, program consistent with the invention. As shown, an icon 1001 representing the selected word/phrase is displayed, along with the corresponding text of the word/phrase 1002, and during this display, a recording of native speaker saying the corresponding word/phrase is played. In the screen view 1000 shown, the written and spoken phrase corresponding to the displayed icon 1001 is "a bicycle", a phrase incorporating both a core vocabulary word ("bicycle") and its corresponding determiner (the indefinite article "a"). A "stop" button 1002 or similar feature may be provided to permit the learner to elect to exit the current session and return to the previous menu.

Figure 11:
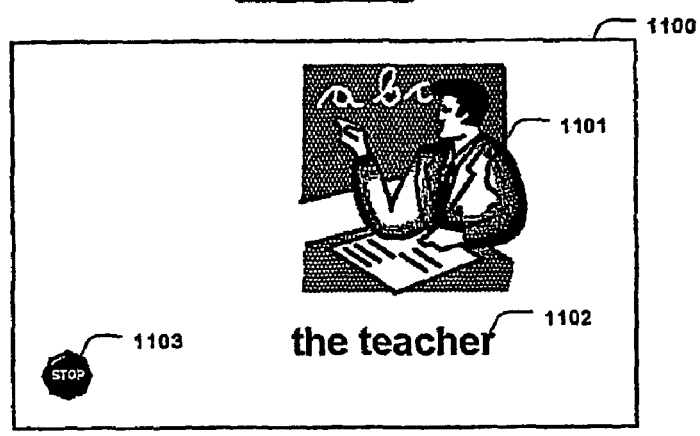
FIG. 11 is a screen view illustrating another exemplary icon and written word view in an exemplary Day 2 or Day 3 of one week of a multi-week language acquisition program consistent with the invention.

FIG. 11 is a screen view 1100 illustrating another exemplary icon and written word view in an exemplary Day 2 or Day 3 of one week of a multi-week language acquisition program consistent with the invention. As shown, an icon 1101 representing the selected word/phrase is displayed, along with the corresponding text of the word/phrase 1102, and during this display, a recording of native speaker saying the corresponding word/phrase is played. In the screen view 1100 shown, the written and spoken phrase corresponding to the displayed icon 1101 is "the teacher", a phrase incorporating both a core vocabulary word ("teacher") and its corresponding determiner (the definite article "the"). A "stop" button 1102 or similar feature may be provided to permit the learner to elect to exit the current session and return to the previous menu.

Figure 12:
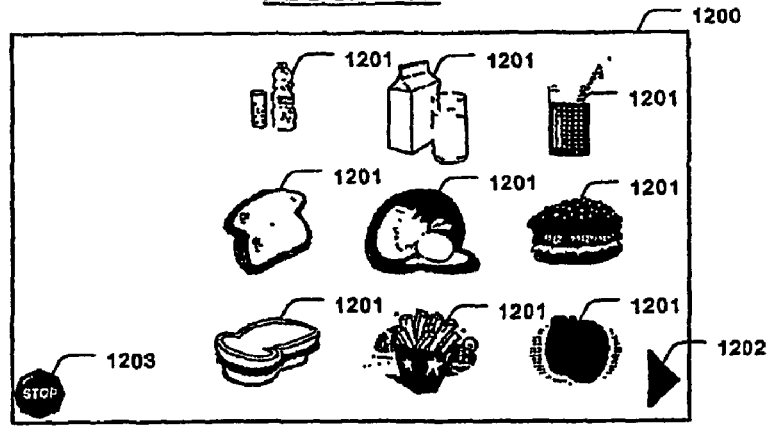
FIG. 12 is a screen view illustrating an exemplary first segment in an exemplary Day 4 of one week of a multi-week language acquisition program consistent with the invention.

FIG. 12 is a screen view 1200 illustrating an exemplary first segment in an exemplary Day 4 of one week of a multi-week language acquisition program consistent with the invention. As shown, nine icons 1201 are displayed, each representing a word or phrase from Days 1–3 of the lesson. In this screen view 1200, the learner is given the opportunity to click on the icons 1201 for which he or she already knows the appropriate corresponding word/phrase to eliminate them from the screen view 1200, and optionally to pronounce "out loud" the word/phrase prior to eliminating it. Once the learner has eliminated the words he or she already knows, he or she may click on a "forward" button 1202, which leads the learner to successive screen views (e.g., resembling FIGS. 10 or 11), one at a time, of each the words/phrases he or she has not already learned and its corresponding icon, and at the same time, a recording is played of a native speaker saying each of the words, as well. A "stop" button 1203 or similar feature may be provided to permit the learner to elect to exit the current session and return to the previous menu.

Figure 13:
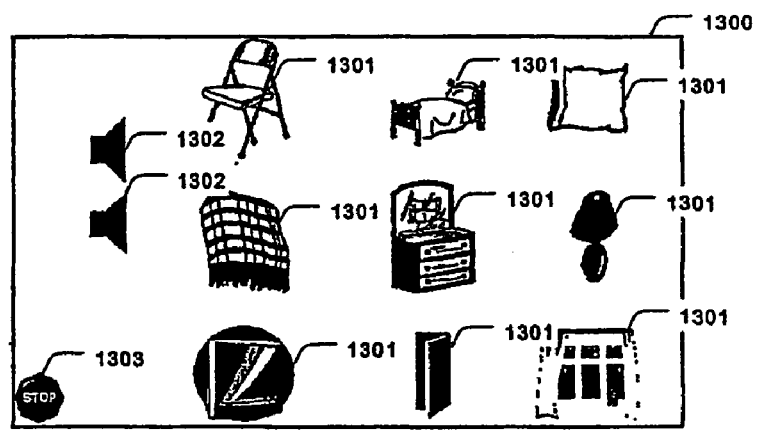
FIG. 13 is a screen view illustrating an exemplary second segment in an exemplary Day 4 of one week of a multi-week language acquisition program consistent with the invention.

FIG. 13 is a screen view 1300 illustrating an exemplary second segment in an exemplary Day 4 of one week of a multi-week language acquisition program consistent with the invention. As shown, nine icons 1301 are displayed, each representing a word or phrase from Days 1–3 of the lesson, and "speaker" icons 1302 are displayed adjacent the nine icons 1301, each "speaker" icon 1302 representing the audio recording of a word/phrase corresponding to one of the icons 1301. In this screen view 1300, the learner is given the opportunity to click on the "speaker" icons 1302, at which time a recording is played of a native speaker saying a word/phrase corresponding to one of the icons 1301. The learner must then select the appropriate icon 1301 and is given appropriate feedback to indicate whether the choice was correct. For the missed words/phrases, the learner may be shown successive screening views (e.g., resembling FIGS. 10 or 11), one at a time, of each the words/phrases he or she missed and its corresponding icon, and at the same time, a recording is played of a native speaker saying each of the words, as well. A "stop" button 1303 or similar feature may be provided to permit the learner to elect to exit the current session and return to the previous menu.

Figure 14:
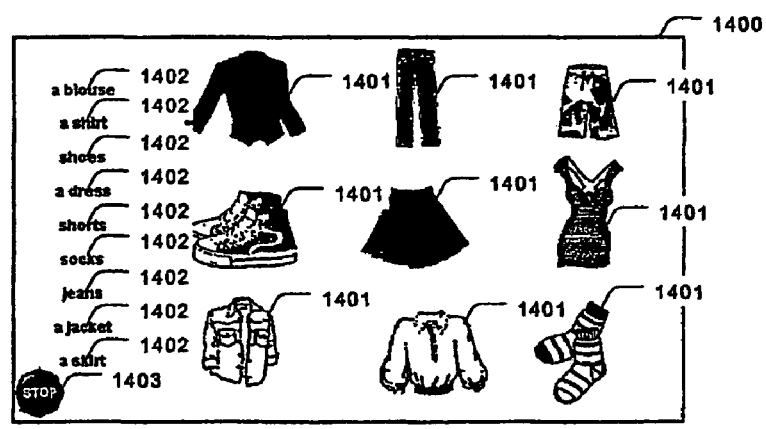
FIG. 14 is a screen view illustrating an exemplary third segment in an exemplary Day 4 of one week of a multi-week language acquisition program consistent with the invention.

FIG. 14 is a screen view 1400 illustrating an exemplary third segment in an exemplary Day 4 of one week of a multi-week language acquisition program consistent with the invention. As shown, nine icons 1401 are displayed, each representing a word or phrase from Days 1–3 of the lesson, and the written words/phrases 1402 corresponding to each of the icons 1401 are displayed adjacent the nine icons 1401. In this screen view 1400, the learner must drag (or otherwise match) each written word/phrase 1402 to the appropriate icon 1401 and is given appropriate feedback to indicate whether the choice was correct. For the missed words/phrases, the learner may be shown successive screen views (e.g., resembling FIGS. 10 or 11), one at a time, of each the words/phrases he or she missed and its corresponding icon, and at the same time, a recording is played of a native speaker saying each of the words, as well. A "stop" button 1403 or similar feature may be provided to permit the learner to elect to exit the current session and return to the previous menu.

Figure 15:
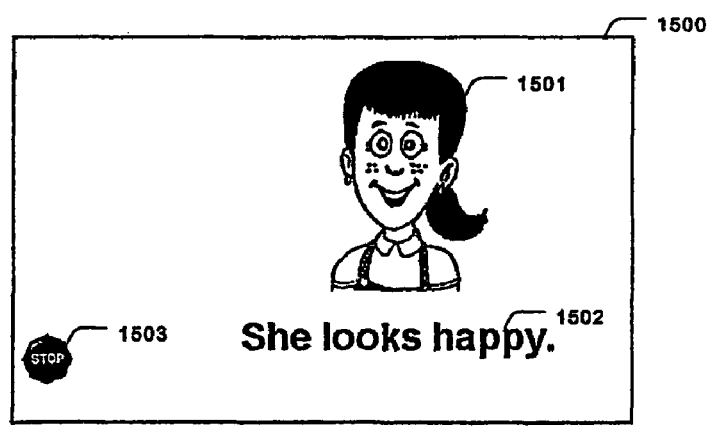
FIG. 15 is a screen view illustrating an exemplary icon and written sentence/short phrase view in the first segment of an exemplary Day 5 of one week of a multi-week language acquisition program consistent with the invention.

FIG. 15 is a screen view 1500 illustrating an exemplary icon and written sentence/short phrase view in the first segment of an exemplary Day 5 of one week of a multi-week language acquisition program consistent with the invention. As shown, an icon 1501 representing the selected sentence/short phrase is displayed, along with the corresponding text of the sentence/short phrase 1502, and during this display, a recording of native speaker saying the corresponding sentence/short phrase is played. In the screen view 1500 shown, the written and spoken sentence/short phrase corresponding to the displayed icon 1501 is "She looks happy", a sentence incorporating a vocabulary word from previous Days 1–3 ("happy"), and implicitly teaching a grammar structure using the verb "looks", along with the proper use of the subjective case pronoun "she". A "stop" button 1503 or similar feature may be provided to permit the learner to elect to exit the current session and return to the previous menu.

FIG. 16 is a screen view 1600 illustrating an exemplary second segment in an exemplary Day 5 of one week of a multi-week language acquisition program consistent with the invention. As shown, nine icons 1601 are displayed, each representing a sentence/short phrase from the first segment of Day 5. In this screen view 1600, the learner is given the opportunity to click on the icons 1601 for which he or she already knows the appropriate corresponding sentence/short phrase to eliminate them from the screen view 1600, and optionally to pronounce "out loud" the sentence/short phrase prior to eliminating it. Once the learner has eliminated the sentences/short phrases he or she already knows, he or she may click on a "forward" button 1602, which leads the learner to successive screen views (e.g., resembling FIGS. 15), one at a time, of each the sentences/short phrases he or she has not already learned and its corresponding icon, and at the same time, a recording is played of a native speaker saying each of the sentences/short phrases, as well. A "stop" button 1603 or similar feature may be provided to permit the learner to elect to exit the current session and return to the previous menu.

Exemplary Vocabulary and Lesson Content

FIG. 17 is a table 1700 listing ninety exemplary vocabulary words that are taught in Days 1–3 and tested in Day 4 of an exemplary first week of a multi-week language acquisition program consistent with the invention. As shown, the words taught may include words relating to, e.g., animals, body parts, clothing, colors, food, sports, transportation, household items, activities, occupations, etc. In this exemplary word set, the words that are underlined are further used in Day 5, in combination with one another and/or with other words not listed in table 1700. Although the words listed are only English words, those skilled in the art should recognize that the words (and determiners, as appropriate) could be those of any language (e.g., "un chien"/"une chienne" in French, or "un perro"/"une perra" in Spanish).

FIG. 18 is a table 1800 listing fifty exemplary sentences/short phrases 1802 that are taught in Day 5 of an exemplary first week of a multi-week language acquisition program consistent with the invention. As shown, the sentences/short phrases 1802 comprise the underlined words from table 1700, in combination with one another and/or with other words. Table 1800 also includes a brief description 1801 of the grammatical structures being implicitly taught by means of teaching the sentences/short phrases 1802 shown.

FIG. 19 is a table 1900 listing the lesson contents of an exemplary fifteen-week language acquisition program consistent with the invention. As shown, the program comprises fifteen weekly lessons 1901, each with a set of topics/vocabulary 1902 to be taught, as well as a verb tense to be used 1903, grammatical structures to be taught 1904, types of dialogues to be used 1905, and descriptions to be used 1906 over the course of the lesson.

First Case Study

The success of a language acquisition program consistent with the invention has been shown in a research study utilizing such a program. The purpose of the study was to see if the software consistent with the invention could: (a) accelerate the acquisition of vocabulary, and (b) speed up auditory processing time in adult learners of English currently enrolled in beginning ESL community college courses. Knowing enough vocabulary words and recognizing them quickly is necessary for understanding spoken language, which is a continual stream of speech, i.e., when speaking, people do not stop between words when saying them. Participants in the study included 24 females and 8 males, ranging from 18 to 78 years of age, who had lived in the U.S. from 3 months to 25 years, and who spoke five native languages: Spanish, Russian, Czech, Korean, and Japanese. The test participants in this study used a software-based learning acquisition method consistent with the invention (containing 360 vocabulary words) for 30 minutes per day, 4 days per week for 4 weeks, with total software time from participants ranging from 2–8 hours. 126 of the 360 total vocabulary words were selected as words for pre- and post testing. All 126 words were very common words. All participants in the study, 24 test subjects and 8 controls spent a minimum of 8 hours each week in ESL classes. Only the test group used the software (averaging 6.67 hours over four weeks); the control group did not. Participants in the study took the same test prior to and following use of the software. Control subjects did not use the software, but took the same test two times, four weeks apart. The results of the study are summarized in the table below:

| Participants | % Correct Words | | Response time for test | |
| --- | --- | --- | --- | --- |
| | Pre | Post | Pre | Post |
| Test group (p < .001) | 72 | 89 | 17.3 minutes | 12.5 minutes |
| Control group (p < .25) | 82 | 82 | 13.9 minutes | 12.8 minutes |

The results of this study show that: (a) the average participant learned 64 new vocabulary words in 6.67 hours using software in a language acquisition method consistent with the invention, without memorization, and retained them in long-term memory; (b) the average participant also reduced his/her processing time by 25%, something that cannot consciously be achieved. By contrast, the control subjects did not learn any of the common words in the test either in the classroom or their environment, nor did they improve their processing time, despite spending a minimum of 8 hours per week in the classroom and living in an English-speaking country. Although the results reported are the average for all participants, there were 2 participants who knew the fewest words prior to using the software who learned approximately 270 and 290 words in 5.5 and 7.5 hours, respectively, based on the pre-post percentages. These subjects demonstrate the true potential for the method of the invention because they are the ones who can show the greatest improvement; in other words, students who come in knowing all 126 test words cannot demonstrate that they have learned new vocabulary. The results of this study are compelling because they demonstrate that: (1) being in the country where a language is spoken is not enough to become proficient in a second language; (2) being in a classroom, under the best of circumstances, is not enough, either, (3) people of all ages can learn new vocabulary, and retain it, at an accelerated rate with the right method; (4) people of all ages can improve the time it takes to process language with the right method; and (5) the method of the present invention leads to an improved rate of vocabulary acquisition and processing time.

Second Case Study 14 students participated in a 4-weekend ESL course at a community college, using the same software-based learning acquisition method, consistent with the invention, as described in the First Case Study, hereinabove. They spent an average of 28 total hours using the software, and, on average, reached lesson 12 (out of 15). Assessment was carried out with a standardized test, the Combined English Language Skills Assessment in a Reading Context (CELSA). This test contains short written dialogues and texts. Approximately once per sentence, a word is selected to appear within a multiple-choice box with three other words. Students must indicate which of the four words is the correct one within the sentence context. It is important to note that the majority of cases test the student's knowledge of grammatical words (e.g., "She thinks she [would/will/doesn't/looks] like to continue studying"). The method of the present invention does not explicitly teach grammar, so any improvement indicates that students have learned this information implicitly, just as do children learning a native language. This is, of course, a core element of the approach of the present invention. The CELSA test has two equivalent forms (so that any one student could be tested twice, once on each variant). Students were tested at the onset of the course and on the next to last (seventh) day of the course, half with Form 1 first and half with Form 2 first. Analysis of test scores shows the mean improvement to be 3 points (roughly one third of a "proficiency level"). Statistical analysis reveals that this difference is significant: $t(13)=2.3036$, $p=0.038$.

ALTERNATIVE EMBODIMENTS

Those skilled in the art will recognize that, although the embodiments described herein generally comprise five sessions per lesson, or four or five "days" per week, a language acquisition method and/or software consistent with the invention is not constrained to any particular number of weeks, lessons, sessions, or days. It should be further recognized by those skilled in the art that some embodiments of the invention may not exactly follow the structure described in the exemplary embodiments set forth herein, e.g., five sessions per lesson. For example, one or more sessions might be omitted altogether, presented in a different sequence, combined with other sessions or other techniques for language acquisition not central to the invention, shortened, or otherwise modified. Additionally, although the words/phrases per lesson/week are typically described herein as being around or at 90, it should be recognized that such numbers are given by way of example, and not as numeric limitations on the method of the invention. Further, different graphics representing the same words/phrases may be used to depict the words/phrases at different times in the lessons (e.g., "a teacher" might be depicted sometimes as a young woman teacher with glasses sitting at a desk, sometimes as an older man standing next to a blackboard holding a piece of chalk etc.).

It should be further recognized that the terms "simultaneous" and "simultaneously", when used in the context of graphical display, display of vocabulary items, and/or playing of recordings of spoken vocabulary items, are not meant to be absolute limitations, but are merely provided as exemplary methods consistent with the invention. For example, a vocabulary item may be spoken, and then the corresponding image may be displayed after the recording is over, or an image may be shown, and then the corresponding vocabulary item spoken once the image is no longer being displayed. Alternatively, the written form of a vocabulary item may be displayed, and then the recording of that item played, and only after that, the image might be shown. Thus, it is only necessary that the graphical displays of vocabulary items, displays of the written form of vocabulary items, and/or playing of recordings of spoken vocabulary items occur sufficiently proximate to one another and without intervention of other, unrelated spoken words, displayed images, or written words, so as to present a logical connection to the learner between these events (the phrase "substantially simultaneously", as used herein, embodies this concept). The present invention does not require that pure simultaneity occur with respect to these events, although the simultaneous occurrence of these events is appreciably one means of logically connecting one or more of: a recording of a spoken vocabulary item, a display of a graphic corresponding to that vocabulary item, and/or a display of the written form of that vocabulary item.

The terms "rapid" and "rapidly" herein refer generally to events (i.e. substantially simultaneous playing of recording of vocabulary item and showing of graphic and/or written form of vocabulary item) that occur at a rate of approximately thirty vocabulary items per minute (or 90 words/phrases over three minutes), or alternatively, events separated by a time frame of approximately 750 milliseconds. Those skilled in the art will recognize that embodiments of the present invention may comprise events at rates varying from the foregoing thirty events per minute (or gaps of 750 milliseconds between events), and that the scope of the present invention and the terms "rapid" and "rapidly" are also intended to cover variances on the order of anywhere from +/−0.0001 second to +/−60 seconds with respect to the foregoing rates.

It should also be understood that the rapid/successive/simultaneous events described in the foregoing paragraphs may either occur at predetermined intervals, as described above, or else alternatively, only upon command by the learner (e.g., via a mouse click or press of a key on the keyboard) to advance to the next event (in a manner akin to a slideshow or filmstrip). In certain embodiments, the learner may be provided with a command (e.g., via a mouse click or press of a key on the keyboard) for repeating the current event/vocabulary item, or one or more previous events/vocabulary items, and that the scope of the present invention is intended to cover all such embodiments. Moreover, any such automatic intervals may be user-selectable, such that the learner may specify the timing of the events, given a range of available timings (e.g., 0 to 5000 milliseconds; or 2 to 90 words/phrases a minute).

Those skilled in the art will appreciate that the testing portions of the embodiments described herein may be eliminated altogether from certain embodiments of the invention, and that it may be desirable, in certain methods of teaching a language consistent with the invention, to include no testing exercises in such a teaching program as it should be understood that the testing portions do not necessarily aid in learning and may only serve to provide feedback regarding subject matter learned.

Moreover, it should be understood that, although the present invention is described herein as comprising both audio and visual components, certain learners will learn better using only the audio or only the visual portions of a program consistent with the invention, which is one reason why both audio and visual components are provided. However, learners having certain disabilities, e.g., blindness or deafness, may take advantage of only the visual or only the audio portions of a program consistent with the invention. Thus, teaching a "first" language, such as sign language, may be facilitated with a program consistent with the invention, wherein the audio components of the program are not employed by the learner during the teaching process.

The term "vocabulary item" as used herein may refer to a word (e.g., "boy"), a short word phrase (e.g., a noun and a corresponding article, such as "a boy"), another set of words (e.g., "toy truck"), a longer phrase (e.g., a verb phrase, such as "he sleeps"), a sentence (e.g., "The men are swimming."), or even non-words, such as interjections and onomatopeias (e.g., "chirp", "buzz", "moo", "whistle", "hum", "screech", "bang", "ding dong", "boo hoo", "phooey", "whoopee", "cheers", etc.).

While the invention is described herein as relating to the teaching of one or more first or foreign languages, the utility of the invention as applied to language acquisition is provided herein only as an example of data capable of interacting with the invention and should not be construed so as to limit the use of the invention solely in such a setting. While the discussion herein presumes the use of the invention with respect to language teaching and learning, it is anticipated that the invention may have utility in other contexts, as well. It should further be recognized that, while the present invention is described herein as relating to language acquisition, the methods described herein may also may have applicability to learning other subjects for which such an information acquisition method may be appropriate, e.g., social studies or sciences. Is this enough for a global filing? It seems to me as though the focus of all the auxiliary uses is the L2 learner, even though that's not necessarily a requirement. For example, software that could teach social studies to L2 $4^{th}$ graders could also teach to L1 $4^{th}$ graders, since the focus would be vocabulary and content. What do you think? I'd like to see more here.

It will be appreciated by those skilled in the art that although the functional components of the exemplary embodiments of the system of the present invention described herein may be embodied as one or more distributed computer program processes, data structures, dictionaries and/or other stored data on one or more conventional general purpose computers (e.g. IBM-compatible, Apple Macintosh, and/or RISC microprocessor-based computers), mainframes, minicomputers, conventional telecommunications (e.g. modem, DSL, satellite and/or ISDN communications), memory storage means (e.g. RAM, ROM) and storage devices (e.g. computer-readable memory, disk array, direct access storage) networked together by conventional network hardware and software (e.g. LAN/WAN network backbone systems and/or Internet), other types of computers and network resources may be used without departing from the present invention. One or more networks discussed herein may be a local area network, wide area network, internet, intranet, extranet, proprietary network, virtual private network, a TCP/IP-based network, a wireless network, a modem-based telephonic network, an interactive telephonic, videoconference, or videotext-type network accessible to learners by a combination video and telephone device, or a combination of one or more of the foregoing.

The invention as described herein may be embodied in a standalone computer environment or in a computer residing on a server system, and input/output access to the invention may comprise appropriate hardware and software (e.g. personal and/or mainframe computers provisioned with Internet wide area network communications hardware and software (e.g. CQI-based, FTP, Netscape Navigator™ or Microsoft Internet Explorer™ HTML Internet browser software, and/or direct real-time TCP/IP interfaces accessing real-time TCP/IP sockets) for permitting human users to send and receive data, or to allow unattended execution of various operations of the invention, in real-time and/or batch-type transactions. Likewise, the system of the present invention may be a remote internet-based server accessible through conventional communications channels (e.g. conventional telecommunications, broadband communications, wireless communications) using conventional browser software (e.g. Netscape Navigator™ or Microsoft Internet Explorer™). Thus, the present invention may be appropriately adapted to include such communication functionality and internet browsing ability, e.g., using Java applets, active scripting, or other web-based means for transmitting graphics, text and/or software between an end user's web browser and one or more host machines. Additionally, those skilled in the art will recognize that the various components of the server system of the present invention may be remote from one another, and may further comprise appropriate communications hardware/software and/or LAN/WAN hardware and/or software to accomplish the functionality herein described.

Each of the functional components of the present invention may be embodied as one or more distributed computer program processes running on one or more conventional general purpose computers networked together by conventional networking hardware and software. Each of these functional components may be embodied by running distributed computer program processes (e.g., generated using "full-scale" relational database engines such as IBM DB2™, Microsoft SQL Server™, Sybase SQL Server™, Oracle 7.3™, or Oracle 8.0™ database managers, and/or a JDBC interface to link to such databases) on networked computer systems (e.g. comprising mainframe and/or symmetrically or massively parallel computing systems such as the IBM SB2™ or HP 9000™ computer systems) including appropriate mass storage, networking, and other hardware and software for permitting these functional components to achieve the stated function. These computer systems may be geographically distributed and connected together via appropriate wide- and local-area network hardware and software. In one embodiment, program data may be made accessible to the user via standard SQL queries for analysis and reporting purposes.

Primary elements of the invention may be server-based and may reside on hardware supporting an operating system such as Microsoft Windows NT/2000™ or UNIX. Clients may include a PC that supports Apple Macintosh™, Microsoft Windows 95/98/NT/ME/2000™, a UNIX Motif workstation platform, or other computer capable of TCP/IP or other network-based interaction. In one embodiment, no software other than a web browser may be required on the client platform.

Alternatively, the aforesaid functional components may be embodied by a plurality of separate computer processes (e.g. generated via dBase™, Xbase™, MS Access™ or other "flat file" type database management systems or products) running on IBM-type, Intel Pentium™ or RISC microprocessor-based personal computers networked together via conventional networking hardware and software and including such other additional conventional hardware and software as may be necessary to permit these functional components to achieve the stated functionalities. In this alternative configuration, since such personal computers typically may be unable to run full-scale relational database engines of the types presented above, a non-relational flat file "table" (not shown) may be included in at least one of the networked personal computers to represent at least portions of data stored by a system according to the present invention. These personal computers may run the Unix, Microsoft Windows NT/2000™ or Windows 95/98/ME™ operating systems. The aforesaid functional components of a system according to the present invention may also comprise a combination of the above two configurations (e.g. by computer program processes running on a combination of personal computers, RISC systems, mainframes, symmetric or parallel computer systems, and/or other appropriate hardware and software, networked together via appropriate wide- and local-area network hardware and software).

In one embodiment, source code may be written in an object-oriented programming language using relational databases. Such an embodiment may include the use of programming languages such as C++. Other programming languages which may be used in constructing a system according to the present invention include Java, HTML, PERL, UNIX shell scripting, assembly language, Fortran, Pascal, VISUAL BASIC, QUICK BASIC, and Macromedia's Director™ or Shockwave™. Those skilled in the art will recognize that the present invention may be implemented in hardware, software, or a combination of hardware and software.

It should also be appreciated from the outset that one or more of the functional components may alternatively be constructed out of custom, dedicated electronic hardware and/or software, without departing from the present invention. Thus, the present invention is intended to cover all such alternatives, modifications, and equivalents as may be included within the spirit and broad scope of the invention as defined only by the hereinafter appended claims.

What is claimed is:

1. Apparatus for teaching a language, comprising:
a machine configured to display graphical images and having an audio output device for playing an audio segment associated with a graphical image, the machine further configured to teach a language by the following presentation sequence, all of which is exclusively presented in the language;

(A) an initial presentation in which a set of vocabulary items, each of which comprises at least one word is successively presented by successively displaying a graphical image of each vocabulary item and accompanying each graphical image of a vocabulary item with an audio segment comprising the spoken form of the vocabulary item, the audio segments accompanying the graphical images for at least some vocabulary items including phrasal structures that normally accompany those vocabulary items, respectively; and (B) a subsequent presentation in which (i) vocabulary items from the first presentation are combined with other words to form a set of phrases or sentences and (ii) the set of phrases or sentences are successively presented by successively displaying a graphical image that correlates to each phrase or sentence and accompanying each graphical image with an audio segment comprising the spoken form of the phrase or sentence.

2. Apparatus as set forth in claim 1, wherein the machine is configured to present the set of vocabulary items successively at least one additional time by successively displaying graphical images of each of the vocabulary items and accompanying audio segments before the subsequent presentation of vocabulary items combined into phrases or sentences, and the machine is also configured to present the set of phrases or sentences and accompanying audio segments successively at least one additional time as part of the subsequent presentation.

3. Apparatus for teaching a language, comprising:
a machine configured to display graphical images and text material and having an audio output device for playing an audio associated with a graphical image and/or text material, the machine further configured to teach a language by the following presentation sequence, all of which is exclusively presented in the language;

(A) a first presentation in which (i) a set of vocabulary items, each of which comprises at least one word are successively presented by successively displaying a graphical image of each vocabulary item and accompanying each graphical image of a vocabulary item with an audio segment comprising the spoken form of the vocabulary item, the audio output accompanying the graphical images of at least some vocabulary items including phrasal structures that normally accompany those vocabulary items, respectively, and (ii) the set of vocabulary items are successively presented at least one additional time by successively displaying graphical images of each of the vocabulary items and accompanying audio segments;

(B) a second presentation in which (i) the set of vocabulary items are successively presented by successively displaying a graphical image and written form of each vocabulary item and accompanying each graphical image and written form of a vocabulary item with an audio segment comprising the spoken form of the vocabulary item, the audio output accompanying the graphical images and written forms of at least some vocabulary items including phrasal structures that normally accompany those vocabulary items, respectively, and (ii) the set of vocabulary items are successively presented at least one additional time by successively displaying graphical images and written forms of each of the vocabulary items and accompanying audio segments; and (C) a third presentation in which (i) vocabulary items from the first and second presentations are combined into a set of phrases or sentences and the set of phrases or sentences are successively presented by successively displaying a graphical image that correlates to each phrase or sentence and accompanying each graphical image with an audio comprising the spoken form of the phrase or sentence, including the grammatical structure of the phrase or sentence, and (ii) the set of phrases or sentences and accompanying audio segments are successively presented at least one additional time.

4. A system for teaching a language, said system comprising:
a computer system, said computer system having a screen, an audio output device, and at least one memory device;
stored data comprising a set of vocabulary items stored in said at least one memory device, a plurality of audio segments that are exclusively in the language, and a plurality of graphical images, each said vocabulary item comprising at least one word, each of said audio segments corresponding to and comprising a spoken representation of a respective vocabulary item in the language, each of said graphical images corresponding to and comprising a visual representation of a respective vocabulary item;
a first set of machine-readable instructions in said at least one memory device that retrieves from said memory device a graphical image and audio segment associated with a vocabulary item from said set of vocabulary items;
a second set of machine-readable instructions in said at least one memory device that displays on said screen said graphics image corresponding to said vocabulary item, and substantially simultaneously playing via said audio output device said audio segment corresponding to said one vocabulary item; and
additional machine readable instructions in said at least one memory device, said additional machine readable instructions configured to (i) retrieve graphical images and play associated audio segments associated with the remaining vocabulary items of said set until the graphical images and associated audio segments associated with the remaining vocabulary items of said set have been displayed and played, and (ii) repeat the retrieval, display and playing of graphical images and associated audio segments for each of the vocabulary items of said set;
wherein the audio segments associated with at least some graphical images include phrasal structures that normally accompany the associated vocabulary items, respectively;
wherein said stored data further comprises a set of combination vocabulary items, combination audio segments, and combination graphical images stored in said at least one memory device, each said combination vocabulary item comprising at least one word from said set of vocabulary items and at least one other word, at least one said combination audio segment corresponding to and comprising a spoken representation of each said combination vocabulary item, and at least one said combination graphical image comprising a visual representation that correlates with each said combination vocabulary item;
wherein the system further comprises a combination set of machine-readable instructions stored in said at least one memory device, that (i) retrieves, displays on said screen and simultaneously plays on said audio device the graphical image and audio segment associated with one said combination vocabulary item from said set of combination vocabulary items and (ii) continues to retrieve, display on said screen and substantially simultaneously play on said audio device the graphical images and audio segments associated with each of the other combination vocabulary items from said set of combination vocabulary items; and
wherein said computer system is configured to execute the first, second, additional and combination machine readable instructions, in that sequence.

5. A system as defined in claim 4, wherein said first, second and additional sets of machine readable instructions are configured to retrieve and display on said screen the written form of the vocabulary items associated with said graphical images and audio segments.

6. A system as defined in claim 4, wherein said audio segments comprise recordings of each said vocabulary item spoken by a plurality of speakers; and
wherein said additional set of machine-readable instructions retrieves and plays a recording of at least some vocabulary items spoken by a different speaker when the retrieval, display and playing of graphical images and associated audio segments for each of the vocabulary items of said set is repeated.

7. A system as defined in claim 4, wherein said audio segments comprise recordings of each said vocabulary item spoken by a plurality of speakers; and
wherein said combination set of machine-readable instructions retrieves and plays a recording of at least some combination vocabulary items spoken by a different speaker when the retrieval, display and playing of graphical images and associated audio segments for each of the combination vocabulary items of said set is repeated.

8. A method for teaching a language, comprising the steps of:
providing a computer configured to display graphical images and text material and having an audio output device for playing an audio associated with a graphical image and/or text material,
teaching the language by the following presentation sequence, all of which is presented by the computer exclusively in the language;
(A) providing a first presentation in which (i) a set of vocabulary items, each of which comprises at least one word are successively presented by successively displaying a graphical image of each vocabulary item and accompanying each graphical image of a vocabulary item with an audio segment comprising the spoken form of the vocabulary item, the audio output accompanying the graphical images of at least some vocabulary items including phrasal structures that normally accompany those vocabulary items, respectively, and (ii) the set of vocabulary items are successively presented at least one additional time by successively displaying graphical images of each of the vocabulary items and accompanying audio segments;
(B) providing a second presentation in which (i) the set of vocabulary items are successively presented by successively displaying a graphical image and written form of each vocabulary item and accompanying each graphical image and written form of a vocabulary item with an audio segment comprising the spoken form of the vocabulary item, the audio output accompanying the graphical images and written forms of at least some vocabulary items including phrasal structures that normally accompany those vocabulary items, respectively, and (ii) the set of vocabulary items are successively presented at least one additional time by successively displaying graphical images and written forms of each of the vocabulary items and accompanying audio segments; and (C) providing a third presentation in which (i) vocabulary items from the first and second presentations are combined into a set of phrases or sentences and the set of phrases or sentences are successively presented by successively displaying a graphical image that correlates to each phrase or sentence and accompanying each graphical image with audio comprising the spoken form of the phrase or sentence, including the grammatical structure of the phrase or sentence, and (ii) the set of phrases or sentences and accompanying audio segments are successively presented at least one additional time.

* * * * *